US009235395B2

(12) United States Patent
Kodosky et al.

(10) Patent No.: US 9,235,395 B2
(45) Date of Patent: *Jan. 12, 2016

(54) GRAPHICAL DEVELOPMENT AND DEPLOYMENT OF PARALLEL FLOATING-POINT MATH FUNCTIONALITY ON A SYSTEM WITH HETEROGENEOUS HARDWARE COMPONENTS

(71) Applicant: NATIONAL INSTRUMENTS CORPORATION, Austin, TX (US)

(72) Inventors: Jeffrey L. Kodosky, Austin, TX (US); Hugo A. Andrade, Austin, TX (US); Brian Keith Odom, Georgetown, TX (US); Cary Paul Butler, Austin, TX (US); Brian C. MacCleery, Austin, TX (US); James C. Nagle, Austin, TX (US); J. Marcus Monroe, Austin, TX (US); Alexandre M. Barp, Leander, TX (US)

(73) Assignee: National Instruments Corporation, Austin, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/063,049

(22) Filed: Oct. 25, 2013

(65) Prior Publication Data

US 2014/0359589 A1    Dec. 4, 2014

Related U.S. Application Data

(60) Provisional application No. 61/828,769, filed on May 30, 2013.

(51) Int. Cl.
*G06F 17/50*  (2006.01)
*G06F 9/45*  (2006.01)

(52) U.S. Cl.
CPC ...................... *G06F 8/451* (2013.01)

(58) Field of Classification Search
CPC ................................ G06F 9/30003
USPC ........................................ 716/117
See application file for complete search history.

(56) References Cited

U.S. PATENT DOCUMENTS 4,901,221 A    2/1990   Kodosky et al.
4,914,568 A    4/1990   Kodosky et al.

(Continued)

OTHER PUBLICATIONS

U.S. Appl. No. 61/828,769, titled "Development and Deployment of Parallel Floating-Point Math Functionality on a System with Heterogeneous Hardware Components", by Jeffrey L. Kodosky, Hugo A. Andrade, Brian Keith Odom, Cary Paul Butler, Brian C. MacCleery, James C. Nagle, J. Marcus Monroe, Alexandre M. Barp, filed May 30, 2013, 118 pages.

(Continued)

*Primary Examiner* — Suchin Parihar
(74) *Attorney, Agent, or Firm* — Meyertons Hood Kivlin Kowert & Goetzel, P.C.; Jeffrey C. Hood; Mark S. Williams

(57) ABSTRACT

System and method for configuring a system of heterogeneous hardware components, including at least one: programmable hardware element (PHE), digital signal processor (DSP) core, and programmable communication element (PCE). A program, e.g., a graphical program (GP), which includes floating point math functionality and which is targeted for distributed deployment on the system is created. Respective portions of the program for deployment to respective ones of the hardware components are automatically determined. Program code implementing communication functionality between the at least one PHE and the at least one DSP core and targeted for deployment to the at least one PCE is automatically generated. At least one hardware configuration program (HCP) is generated from the program and the code, including compiling the respective portions of the program and the program code for deployment to respective hardware components. The HCP is deployable to the system for concurrent execution of the program.

20 Claims, 28 Drawing Sheets

(56) References Cited

U.S. PATENT DOCUMENTS

| | | | | |
|---|---|---|---|---|
| 5,475,851 | A | 12/1995 | Kodosky et al. | |
| 5,481,740 | A | 1/1996 | Kodosky | |
| 5,481,741 | A | 1/1996 | McKaskle et al. | |
| 5,497,500 | A | 3/1996 | Rogers et al. | |
| 5,734,863 | A | 3/1998 | Kodosky et al. | |
| 5,821,934 | A | 10/1998 | Kodosky et al. | |
| 5,974,254 | A | 10/1999 | Hsu | |
| 6,173,438 | B1 | 1/2001 | Kodosky et al. | |
| 6,219,628 | B1 | 4/2001 | Kodosky et al. | |
| 7,568,178 | B2 | 7/2009 | Moriat | |
| 7,584,465 | B1* | 9/2009 | Koh et al. | 717/162 |
| 7,882,445 | B2 | 2/2011 | Neumann | |
| 7,987,448 | B2 | 7/2011 | Kodosky et al. | |
| 7,992,129 | B2 | 8/2011 | Chandhoke et al. | |
| 7,996,782 | B2 | 8/2011 | Hayles et al. | |
| 8,037,369 | B2 | 10/2011 | Richardson et al. | |
| 8,050,882 | B2 | 11/2011 | Sierer et al. | |
| 8,055,738 | B2 | 11/2011 | Shah et al. | |
| 8,074,201 | B2 | 12/2011 | Ghercioiu et al. | |
| 8,074,203 | B2 | 12/2011 | Dye et al. | |
| 8,099,712 | B2 | 1/2012 | Kodosky et al. | |
| 8,108,833 | B2 | 1/2012 | Dellas et al. | |
| 8,146,050 | B2 | 3/2012 | Moriat | |
| 8,146,053 | B2 | 3/2012 | Morrow et al. | |
| 8,151,244 | B2 | 4/2012 | Hsu et al. | |
| 8,185,834 | B2 | 5/2012 | King et al. | |
| 8,204,925 | B2 | 6/2012 | Vrancic et al. | |
| 8,204,951 | B2 | 6/2012 | Kornerup et al. | |
| 8,205,161 | B2 | 6/2012 | King et al. | |
| 8,205,162 | B2 | 6/2012 | Shah et al. | |
| 8,205,188 | B2 | 6/2012 | Ramamoorthy et al. | |
| 8,214,796 | B2 | 7/2012 | Neumann et al. | |
| 8,239,158 | B2 | 8/2012 | Crain, II et al. | |
| 8,239,177 | B2 | 8/2012 | Chandhoke et al. | |
| 8,239,824 | B2 | 8/2012 | Cifra et al. | |
| 8,239,848 | B2 | 8/2012 | Ghercioiu et al. | |
| 8,429,548 | B2 | 4/2013 | Mendez et al. | |
| 8,429,627 | B2 | 4/2013 | Jedlicka et al. | |
| 8,448,135 | B2 | 5/2013 | Kodosky | |
| 2008/0098349 | A1* | 4/2008 | Lin et al. | 717/106 |
| 2009/0037691 | A1* | 2/2009 | Master et al. | 712/15 |
| 2010/0156888 | A1* | 6/2010 | Luk et al. | 345/418 |
| 2011/0066828 | A1* | 3/2011 | Wolfe et al. | 712/220 |
| 2011/0225524 | A1 | 9/2011 | Cifra | |
| 2012/0197617 | A1 | 8/2012 | Mujagic et al. | |
| 2012/0317397 | A1* | 12/2012 | Master et al. | 712/29 |
| 2014/0040855 | A1* | 2/2014 | Wang et al. | 717/107 |
| 2014/0059524 | A1* | 2/2014 | Kee et al. | 717/154 |
| 2014/0173558 | A1* | 6/2014 | Martinez Canedo et al. | 717/121 |
| 2014/0189317 | A1* | 7/2014 | Ben-Kiki et al. | 712/220 |
| 2014/0359590 | A1* | 12/2014 | Kodosky et al. | 717/149 |
| 2015/0020078 | A1 | 1/2015 | Kuesel et al. | 718/105 |
| 2015/0169365 | A1* | 6/2015 | Gendler et al. | 717/162 |

OTHER PUBLICATIONS

National Instruments, LabVIEW User Manual, Jul. 2000 Edition, seven pages.

National Instruments, BridgeVIEW User Manual, Oct. 1997 Edition, 435 pages.

IBM Systems & Technology Group, Accelerating Parallel Processing While Simplifying Heterogeneous Environment Management, Nov. 2012, eight pages.

Showerman et al.; QP: A Heterogeneous Multi-Accelerator Cluster; 10th LCI International Conference on High-Performance Clustered Computing; Boulder, Colorado; Mar. 10-12, 2009; eight pages.

* cited by examiner

GRAPHICAL DEVELOPMENT AND DEPLOYMENT OF PARALLEL FLOATING-POINT MATH FUNCTIONALITY ON A SYSTEM WITH HETEROGENEOUS HARDWARE COMPONENTS

PRIORITY DATA

This application claims benefit of priority to U.S. Provisional Application 61/828,769, titled "Development and Deployment of Parallel Floating-Point Math Functionality on a System with Heterogeneous Hardware Components", filed May 30, 2013, whose inventors were Jeffrey L. Kodosky, Hugo A. Andrade, Brian Keith Odom, Cary Paul Butler, Brian C. MacCleery, James C. Nagle, J. Marcus Monroe, and Alexandre M. Barp, which is hereby incorporated by reference in its entirety as though fully and completely set forth herein.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to the field of programming, and more particularly to development and deployment of parallel floating point math functionality on a system with heterogeneous hardware components, and global optimization of programs with floating point math functionality.

DESCRIPTION OF THE RELATED ART

Traditionally, high level text-based programming languages have been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, and industrial automation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. No. 4,901,221 to Kodosky et al discloses a graphical system and method for modeling a process, i.e. a graphical programming environment which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, machine language instructions are automatically constructed which characterize an execution procedure which corresponds to the displayed procedure. Therefore, a user can create a computer program solely by using a graphically based programming environment. This graphically based programming environment may be used for creating virtual instrumentation systems, industrial automation systems and modeling processes, as well as for any type of general programming.

Therefore, Kodosky et al teaches a graphical programming environment wherein a user places on manipulates icons in a block diagram using a block diagram editor to create a data flow "program." A graphical program for controlling or modeling devices, such as instruments, processes or industrial automation hardware, is referred to as a virtual instrument (VI). In creating a virtual instrument, a user preferably creates a front panel or user interface panel. The front panel includes various front panel objects, such as controls or indicators that represent the respective input and output that will be used by the graphical program or VI, and may include other icons which represent devices being controlled. When the controls and indicators are created in the front panel, corresponding icons or terminals are automatically created in the block diagram by the block diagram editor. Alternatively, the user can first place terminal icons in the block diagram which cause the display of corresponding front panel objects in the front panel. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user adjusts the controls on the front panel to affect the input and views the output on the respective indicators.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), and supervisory control and data acquisition (SCADA) applications, among others.

A primary goal of virtual instrumentation is to provide the user the maximum amount of flexibility to create his/her own applications and/or define his/her own instrument functionality. In this regard, it is desirable to extend the level at which the user of instrumentation or industrial automation hardware is able to program instrument. The evolution of the levels at which the user has been able to program an instrument is essentially as follows:
 1. User level software (LabVIEW, LabWindows CVI, Visual Basic, etc.)
 2. Kernel level software
 3. Auxiliary kernel level software (a second kernel running along side the main OS, e.g., InTime, VentureCom, etc.)
 4. Embedded kernel level software (see, e.g., U.S. Pat. No. 6,173,438, referenced herein)
 5. Hardware level software In general, going down the above list, the user is able to create software applications which provide a more deterministic real-time response. Currently, most programming development tools for instrumentation or industrial automation provide an interface at level 1 above. In general, most users are unable and/or not allowed to program at the kernel level or auxiliary kernel level. The user level software typically takes the form of software tools that can be used to create software which operates at levels 1 and/or 4.

Many instrumentation solutions at level 5 primarily exist as vendor-defined solutions, i.e., vendor created modules. In contrast, the LabVIEW FPGA™ (field programmable gate array) development environment, provided by National Instruments Corporation, provides the user with the ability to develop user level software which operates at the hardware level. More particularly, it provides the user with the ability to develop high level software, such as graphical programs, which can then be readily converted into hardware level instrument functionality via implementation on an FPGA, thus providing the user with the dual benefits of being able to program instrument functionality at the highest level possible (text-based or graphical programs), while also providing the ability to have the created program operate directly in hardware for increased speed and efficiency.

Increasingly, complex functionality that was once implemented via multiple different devices or dedicated chips is implemented on a single chip, referred to as an SOC (System-On-Chip). Such chips may include various types of components, e.g., FPGAs, DSP (digital signal processor) cores, microprocessors, and so forth, that may operate in conjunction, e.g., in a parallel or concurrent manner. In current development systems, for a program targeted for deployment on such chips, the user is required to explicitly specify which portions of the program are to be deployed to which components of the chip, and must generally design such partitioning into the program, which is complex, difficult, tedious, and error prone.

SUMMARY OF THE INVENTION

The present invention comprises a computer-implemented system and method for automatically generating hardware level functionality, e.g., parallel system-on-chip (SOC) hardware implementations, including targeting and implementation of floating point math functionality on programmable hardware elements, e.g., programmable hardware or FPGA fabric, and other parallel heterogeneous hardware components, e.g., DSP cores, microprocessors, graphics processing units (GPUs), and so forth, integrated via various programmable communication elements (PCEs). The hardware implementation on such heterogeneous hardware components is generated based on a program, e.g., a graphical and/or textual program, created by a user. This provides the user the ability to develop or define instrument functionality using various programming techniques, e.g., graphical programming techniques, while enabling the resulting program to operate directly in hardware. It should be noted that the techniques disclosed herein are broadly applicable to a variety of types of programs, e.g., graphical programs, textual programs, or programs that include both graphical and textual program code. Embodiments of the invention disclosed herein are primarily described and illustrated in terms of graphical programs, e.g., LabVIEW programs, but should not be considered to restrict the embodiments contemplated to any particular type of program. Thus, for example, methods described in terms of graphical programs are also intended to be applicable to textual programs and/or combinations of the two.

In one embodiment, a program (e.g., graphical, textual, or both) that includes floating point math functionality may be created. The program may be targeted for distributed deployment on a system comprising heterogeneous hardware components, including, but not limited to, at least one programmable hardware element, at least one DSP core, and at least one programmable communication element (PCE).

In one embodiment, the user may first create the program, e.g., a graphical or textual program, which performs or represents the desired functionality. In graphical program implementations, the program will typically include one or more modules or a hierarchy of sub-VIs. Similarly, in textual program implementations, the program may include a hierarchy of functions or subprograms. In some embodiments, the user may place various constructs in portions of the (e.g., graphical) program to aid in conversion of these portions into hardware form. However, in other embodiments, the conversion process may be fully automatic, as described herein.

Respective portions of the program for respective deployment to respective ones of the heterogeneous hardware components may be automatically determined, including determining respective execution timing for the respective portions. In one embodiment, the respective portions may include a first portion targeted for deployment to the at least one programmable hardware element, and a second portion targeted for deployment to the at least one DSP core.

First program code implementing communication functionality (including timing functionality, possibly with constraints) between the at least one programmable hardware element and the at least one DSP core may be automatically generated. The first program code may be targeted for deployment to or on the at least one communication element.

The method may also include automatically generating at least one hardware configuration program from the program and the first program code, including compiling the respective portions of the program and the first program code for deployment to respective ones of the heterogeneous hardware components. Thus, for example, the first portion of the program may be compiled for deployment to the at least one programmable hardware element, thereby generating a first portion of the at least one hardware configuration program, the second portion of the program may be compiled for deployment to the at least one DSP core, thereby generating a second portion of the at least one hardware configuration program, and the automatically generated first program code implementing communication functionality may be compiled for deployment to the at least one communication element, thereby generating a third portion of the at least one hardware configuration program.

The hardware configuration program may be deployable to the system, where after deployment, the system may be configured to execute the program concurrently, including the floating point math functionality. Thus, for example, in one embodiment, deploying the at least one hardware configuration program may include configuring the at least one programmable hardware element with the first portion of the at least one hardware configuration program, configuring the at least one DSP core with the second portion of the at least one hardware configuration program, and configuring the at least one communication element with the third portion of the at least one hardware configuration program. Accordingly, during execution the at least one programmable hardware element performs the functionality of the first portion of the program, the at least one DSP core performs the functionality of the second portion of the program, and the at least one communication element implements communication between the at least one programmable hardware element and the at least one DSP core. In other words, the at least one hardware configuration program may be used to configure the system to implement the functionality of the program (including the floating point math functionality), after which the system may be operable to perform the respective functionality via the heterogeneous hardware components concurrently.

In some embodiments, the hardware configuration program may be directly converted into a hardware configuration program, e.g., an FPGA program file, describing a plurality of computing elements, including, for example, but not limited to, one or more of: fixed point FPGA fabric, floating point FPGA fabric, DSP cores, soft or hardcore microprocessors, graphics processing units (GPUs), or other heterogeneous computing elements which are integrated in one heterogeneous or homogenous chip or chipset or multiple heterogeneous or homogenous chipsets.

The above techniques may also be applied to real-time or faster than real-time simulation, as well as global optimization of system designs via such simulation.

BRIEF DESCRIPTION OF THE DRAWINGS

A better understanding of the present invention can be obtained when the following detailed description of embodiments is considered in conjunction with the following drawings, in which.

Figure 1A:
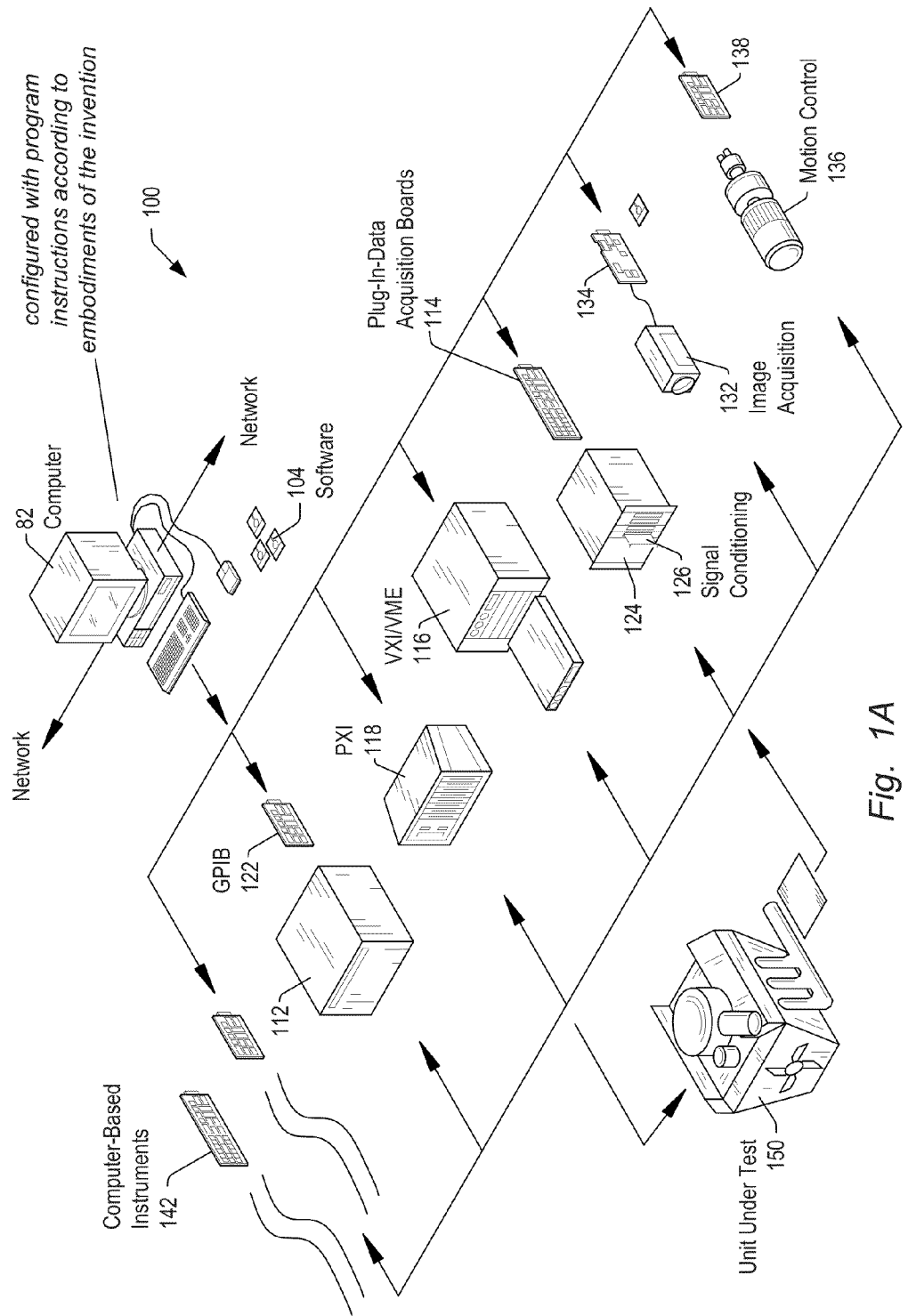
FIG. 1A illustrates an exemplary instrumentation control system, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Provisional Application 61/828,769, titled "Development and Deployment of Parallel Floating-Point Math Functionality on a System with Heterogeneous Hardware Components", filed May 30, 2013.

U.S. patent application Ser. No. 13/347,880, titled "Co-Simulation with Peer Negotiated Time Steps", filed Jan. 11, 2012.

U.S. patent application Ser. No. 12/752,606, titled "Race Structure for a Graphical Program", filed Apr. 1, 2010.

U.S. patent application Ser. No. 12/577,284, titled "Asynchronous Preemptive Edit Time Semantic Analysis of a Graphical Program", filed Oct. 12, 2009.

U.S. patent application Ser. No. 12/720,966, titled "Multi-Touch Editing in a Graphical Programming Language", filed Mar. 10, 2010.

U.S. patent application Ser. No. 12/707,824, titled "Automatically Suggesting Graphical Program Elements for Inclusion in a Graphical Program", filed Feb. 18, 2010.

U.S. Pat. No. 4,901,221 titled "Graphical System for Modeling a Process and Associated Method," issued on Feb. 13, 1990.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 5,734,863, titled "Method and Apparatus for Providing Improved Type Compatibility and Data Structure Organization in a Graphical Data Flow Diagram".

U.S. Pat. No. 5,475,851 titled "Method and Apparatus for Improved Local and Global Variable Capabilities in a Graphical Data Flow Program".

U.S. Pat. No. 5,497,500 titled "Method and Apparatus for More Efficient Function Synchronization in a Data Flow Program".

U.S. Pat. No. 5,821,934, titled "Method and Apparatus for Providing Stricter Data Type Capabilities in a Graphical Data Flow Environment".

U.S. Pat. No. 5,481,740 titled "Method and Apparatus for Providing Autoprobe Features in a Graphical Data Flow Diagram".

U.S. Pat. No. 5,974,254, titled "System and Method for Detecting Differences in Graphical Programs" filed Jun. 6, 1997.

U.S. Pat. No. 6,173,438, titled "Embedded Graphical Programming System" filed Aug. 18, 1997.

U.S. Pat. No. 6,219,628, titled "System and Method for Converting Graphical Programs Into Hardware Implementations".

U.S. Pat. No. 7,987,448, titled "Conversion of a first diagram having states and transitions to a graphical data flow program using an intermediate XML representation".

U.S. Pat. No. 7,882,445, titled "Configurable Wires in a Statechart".

U.S. Pat. No. 8,214,796, titled "Event Firing Node for Asynchronously Passing Events from a Graphical Data Flow Program to a Statechart".

U.S. Pat. No. 8,151,244, titled "Merging graphical programs based on an ancestor graphical program".

U.S. Pat. No. 8,204,925, titled "Controlling or Analyzing a Process by Solving a System of Linear Equations in Real-time".

U.S. Pat. No. 8,239,824, titled "Developing a Graphical Data Flow Program with Multiple Models of Computation in a Web Browser".

U.S. Pat. No. 7,992,129, titled "System and method for programmatically generating a graphical program based on a sequence of motion control, machine vision, and data acquisition (DAQ) operations".

U.S. Pat. No. 7,996,782, titled "Data transfer indicator icon in a diagram".

U.S. Pat. No. 8,050,882, titled "Network-based System for Automatically Generating a Graphical Program Based on User Supplied Measurement Task Requirements".

U.S. Pat. No. 8,055,738, titled "Automatically Generating a Configuration Diagram Based on Task Requirements".

U.S. Pat. No. 8,074,203, titled "Graphical Program Execution with Distributed Block Diagram Display".

U.S. Pat. No. 8,099,712, titled "Generating a Hardware Description Based on a Diagram with States and State Transitions".

U.S. Pat. No. 8,108,833, titled "Automatically Generating a Graphical Data Flow Program from a Statechart".

U.S. Pat. No. 8,146,050, titled "Graphical Program with Physical Simulation and Data Flow Portions".

U.S. Pat. No. 8,185,834, titled "User-Defined Events for a Graphical Programming Environment".

U.S. Pat. No. 8,204,951, titled "Deterministic Communication Between Graphical Programs Executing on Different Computer Systems Using Variable Nodes".

U.S. Pat. No. 8,239,158, titled "Synchronizing a Loop Performed by a Measurement Device with a Measurement and Control Loop Performed by a Processor of a Host Computer".

U.S. Pat. No. 8,205,161, titled "Graphical Programming System with Event-Handling Nodes".

U.S. Pat. No. 8,214,796, titled "Event Firing Node for Asynchronously Passing Events from a Graphical Data Flow Program to a Statechart".

U.S. Pat. No. 8,239,848, titled "Incremental Deployment and Execution of a Program on an Embedded Device".

U.S. Pat. No. 8,239,177, titled "Simulation of a Motion System Including a Mechanical Modeler with Interpolation".

U.S. Pat. No. 8,205,162, titled "Execution Contexts for a Graphical Program".

U.S. Pat. No. 8,146,05, titled "Graphical Programming Environment with First Model of Computation that Includes a Structure Supporting Second Model of Computation".

U.S. Pat. No. 8,205,188, titled "Automatically Generating a Second Graphical Program Based on a First Graphical Program".

U.S. Pat. No. 7,568,178, titled "System Simulation and Graphical Data Flow Programming in a Common Environment Using Wire Data Flow".

U.S. Pat. No. 8,074,201, titled "Deployment and Execution of a Program on an Embedded Device".

U.S. Pat. No. 8,037,369, titled "Error Handling Structure For Use in a Graphical Program".

The above-referenced patents and patent applications disclose various aspects of the LabVIEW graphical programming and development system.

The LabVIEW and BridgeVIEW graphical programming manuals, including the "G Programming Reference Manual", available from National Instruments Corporation, are also hereby incorporated by reference in their entirety.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

FIG. 1A—Exemplary Instrumentation Control System

FIG. 1A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical (or textual) programming development environment application used to create, deploy, and/or implement or execute such graphical (or textual) programs on heterogeneous hardware systems, i.e., systems with heterogeneous hardware components, e.g., including one or more of the instruments shown in FIG. 1A. The memory medium may also store operating system software, as well as other software for operation of the computer system. Various embodiments further include receiving or storing instructions and/or data implemented in accordance with the foregoing description upon a carrier medium. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 1B:
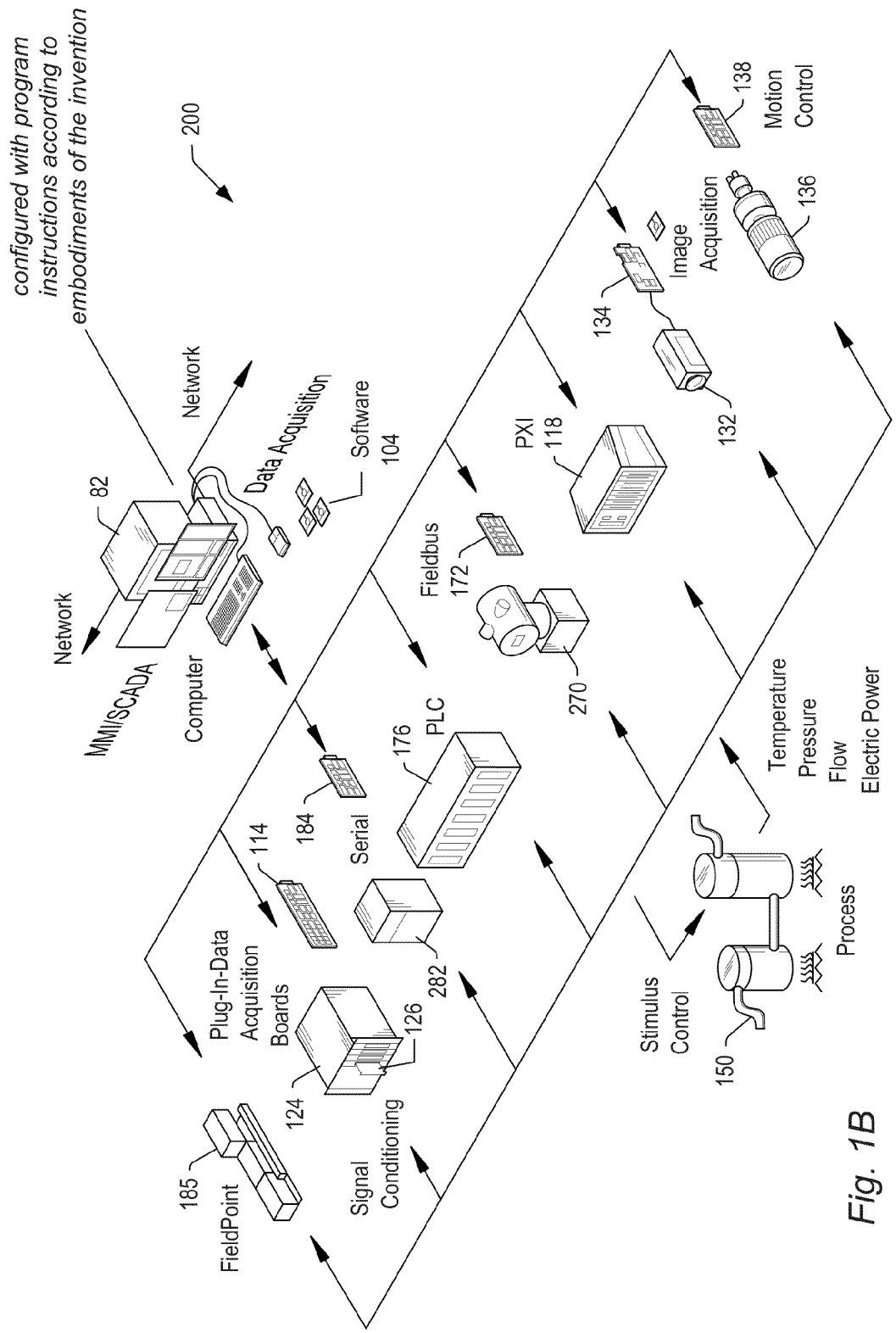
FIG. 1B illustrates an exemplary industrial automation system, according to one embodiment.

FIG. 1B—Exemplary Automation System

FIG. 1B illustrates an exemplary industrial automation system 200 which may implement embodiments of the invention. The industrial automation system 200 is similar to the instrumentation or test and measurement system 100 shown in FIG. 1A. Elements which are similar or identical to elements in FIG. 1A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as the Fieldpoint system available from National Instruments, among other types of devices.

Note that in the exemplary systems of FIGS. 1A and 1B, one or more of the devices connected to the computer 82 may include programmable hardware according to the present invention. In some embodiments, the programmable hardware includes at least one programmable hardware element, e.g., an FPGA (field programmable gate array), an SOC (system-on-chip), or other heterogeneous computing devices containing resources capable of parallel execution. In some embodiments, the programmable hardware may be or include an FPGA fabric. As will be described below in detail, a program, such as a graphical (or textual) program, with floating point math functionality may be implemented in hardware with communication mechanisms between computing heterogeneous elements, which in some embodiments may be located in one or more SOCs or other computing devices, and the hardware components may be networked together locally or remotely, where computation by the components may be synchronized to achieve desired execution timing and parallelization of the respective computing tasks.

The instruments or devices in FIGS. 1A and 1B may be controlled by graphical software programs, optionally a portion of which execute on the CPU of the computer 82, and at least a portion of which may be downloaded (deployed) to the programmable hardware for hardware execution.

In one embodiment, the computer system 82 itself may include a heterogeneous system as described herein, e.g., on an expansion card or connected device. Note, however, that in various embodiments, the configured (via embodiments disclosed herein) heterogeneous system may be implemented or included in any type of devices desired.

Moreover, although in some embodiments the programs and programmable hardware may be involved with data acquisition/generation, analysis, and/or display, and/or for controlling or modeling instrumentation or industrial automation hardware, it is noted that the present invention can be used to create hardware implementations of programs for a plethora of applications and are not limited to instrumentation or industrial automation applications. In other words, the systems of FIGS. 1A and 1B are exemplary only, and the present invention may be used in any of various types of systems. Thus, the systems and methods of the present invention are operable for automatically creating hardware implementations of programs or graphical (or textual) code for any of various types of applications, including general purpose software applications such as word processing, spreadsheets, network control, games, etc.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the program may be used include hardware-in-the-loop testing and rapid control prototyping, among others. More generally, in various embodiments, the heterogeneous system may be used in any type of application desired, e.g., in real-time, faster-than-real-time and slower-than-real-time simulation, digital signal processing, algorithms, mathematics, optimization and search, among others. For example, in one embodiment, the techniques disclosed herein may be applied to the field of system simulation, e.g., simulation of a system such as a circuit, electric power grid, motor, generator, communication network or other complex physical system. The program(s) implemented and processed per the techniques described may further be directed to any of a plurality of execution contexts for desktop or real-time computer targets.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc. Further applications contemplated include hardware-in-the-loop testing and simulation, and rapid control prototyping, among others.

It should also be noted that some embodiments of the methods disclosed herein may be performed or implemented on a computer, such as computer 82, that is not connected to instrumentation or automation devices (as exemplified in FIGS. 1A and 1B), where the method may produce one or more products, such as a hardware configuration program, that may be subsequently used by the computer 82 or conveyed to another computing device for use, e.g., to configure a heterogeneous system.

In the embodiments of FIGS. 1A and 1B above, one or more of the various devices may couple to each other over a network, such as the Internet. In one embodiment, the user operates to select a target device from a plurality of possible target devices for programming or configuration using a program, e.g., a graphical program. Thus the user may create a program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 1A and 1B, may be referred to as virtual instruments.

Figure 2:
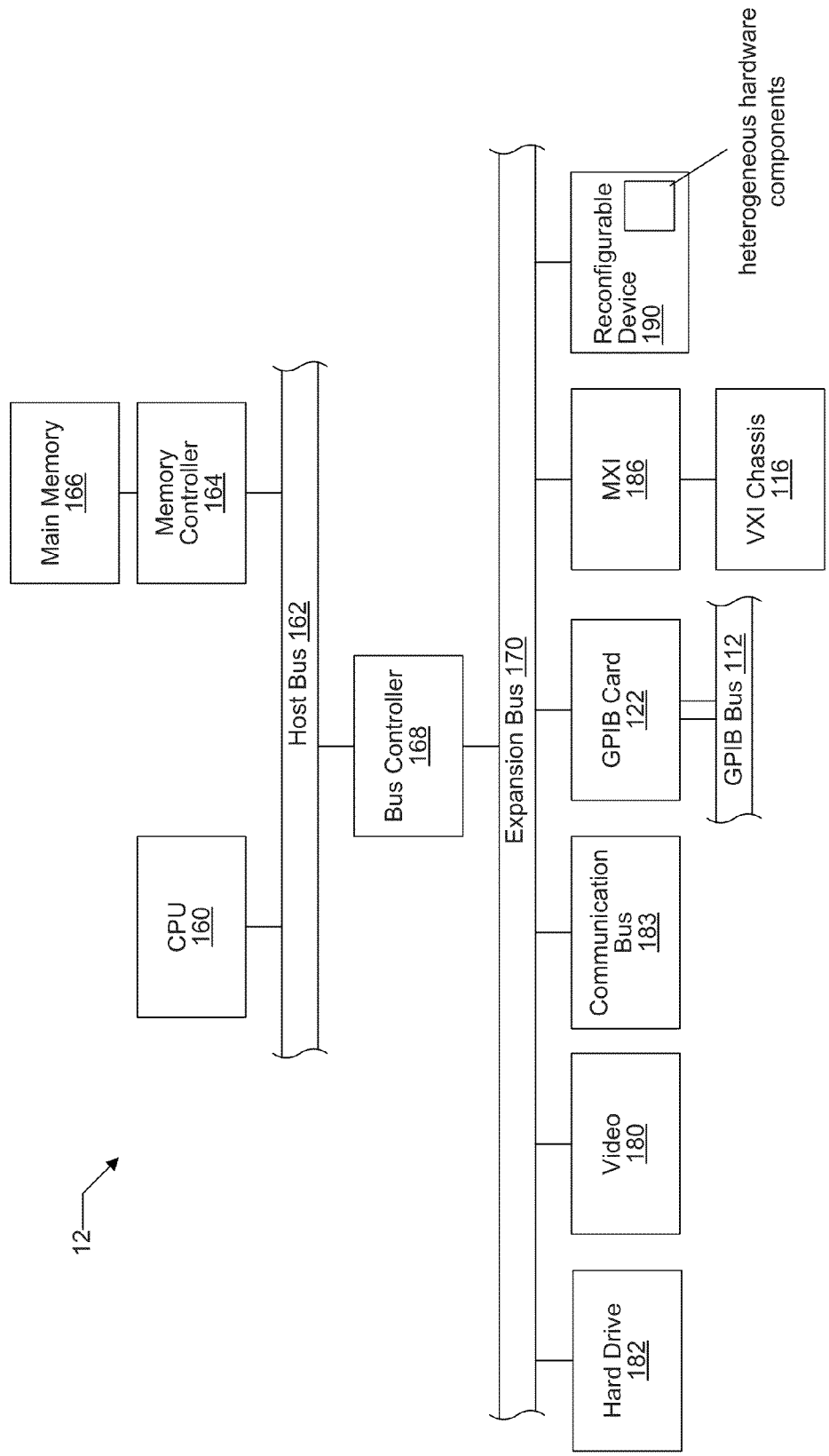
FIG. 2 is a block diagram of the exemplary computer system of FIGS. 1 and 1B, according to one embodiment.

FIG. 2—Computer System Block Diagram

FIG. 2 is a block diagram representing one embodiment of the computer system 82 illustrated in FIGS. 1A and 1B. It is noted that any type of computer system configuration or architecture can be used as desired, and FIG. 2 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, an ARM processor, a GPU processor, as well as others. A memory medium, typically comprising RAM and referred to as main memory, 166 is coupled to the host bus 162 by means of memory controller 164. The main memory 166 may store a programming system, and may also store software for converting at least a portion of a program into a hardware implementation. This software will be discussed in more detail below. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. In the exemplary embodiment shown, the computer 82 further comprises a video display subsystem 180 and hard drive 182 coupled to the expansion bus 170, as well as a communication bus 183. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. More generally, the device may comprise heterogeneous hardware components, such as one or more SOCs, at least one of which may itself include heterogeneous hardware components, as discussed herein. The computer system may be configured to deploy a program to the device 190 for execution of the program on the device 190. In embodiments where the program is a graphical program, the deployed program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Of course, as noted above, in some embodiments, the program may be a textual program, or a combination of graphical and textual program code.

Figure 3:
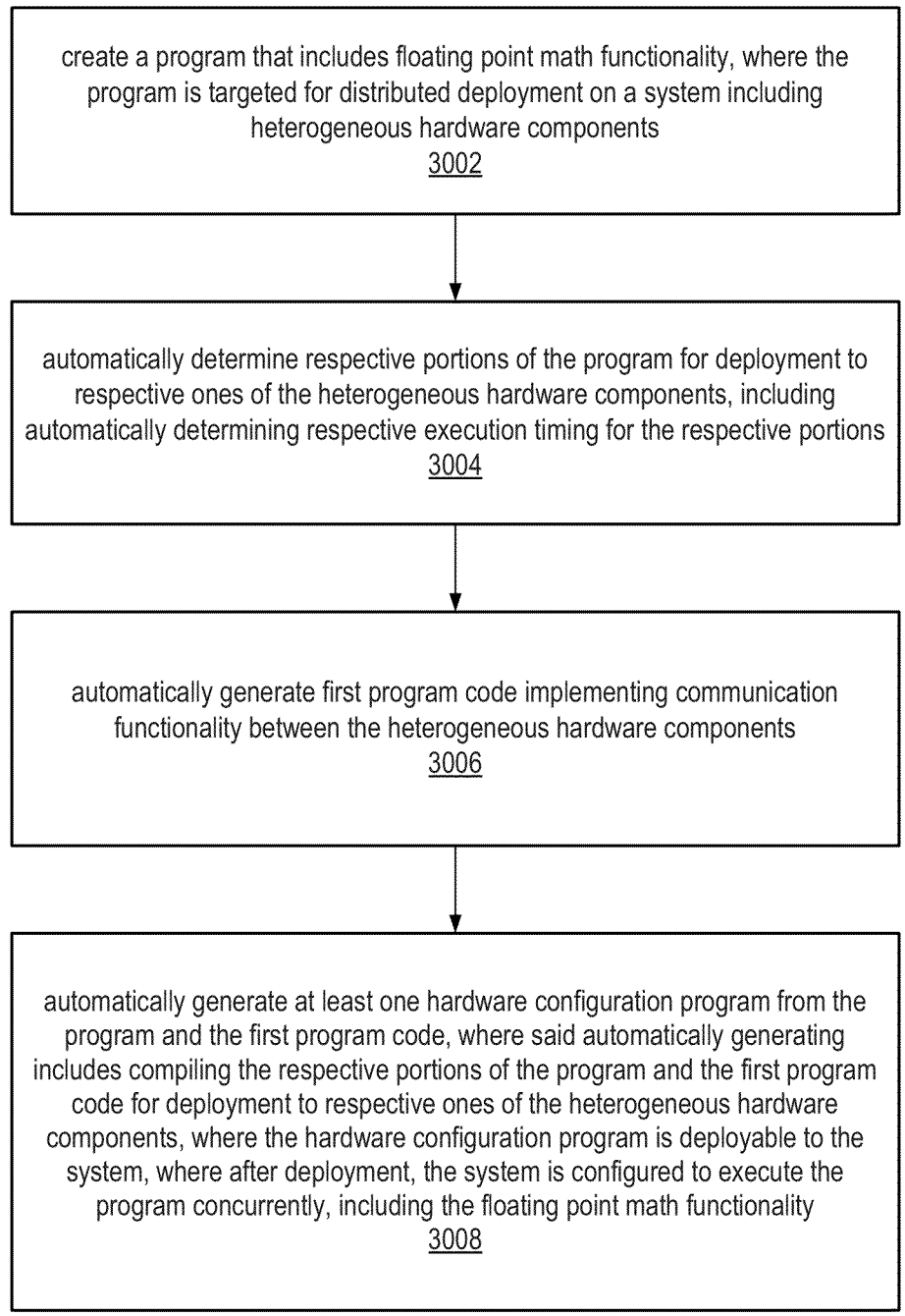
FIG. 3 is a flowchart diagram of a method for developing and deploying a program, e.g., a graphical program, to a system of heterogeneous hardware components, according to one embodiment.

FIG. 3—Flowchart of a Method for Developing and Deploying a Program with Floating Point Math Functionality to a System with Heterogeneous Hardware Components FIG. 3 illustrates a method for developing and deploying a program, e.g., a graphical and/or textual program, with floating point math functionality to a system that includes heterogeneous hardware components, e.g., multiple programmable elements, according to one embodiment. The method shown in FIG. 3 may be used in conjunction with any of the computer systems or devices shown in the Figures, among other devices. In various embodiments, some of the method elements shown may be performed concurrently, in a different order than shown, or may be omitted. Additional method elements may also be performed as desired. As shown, this method may operate as follows.

First, in 3002, a program may be created on the computer system 82 (or on a different computer system). The program may include floating point math functionality (among other functionalities), and may be targeted for distributed deployment on a system that includes heterogeneous hardware components. For example, in one embodiment, the system may include at least one programmable hardware element, at least one digital signal processor (DSP) core, and at least one programmable communication element (PCE), although other hardware components are also contemplated (see, e.g., FIGS. 4B, 5A, and 5B, described below). It should be noted that in addition to the floating point math functionality, the program may include any other types of functionality as desired, e.g., fixed point math functionality, integer math functionality, string manipulation, etc.

Exemplary PCEs include, but are not limited to, various data transfer mechanisms, internal communication elements, programmable interconnect elements, configurable logic blocks, switch matrices, clock lines, input/output buffers (IOBs), serial data buses, parallel data buses used to connect heterogeneous hardware components and systems of heterogeneous hardware, e.g., programmable hardware elements, DSP cores, microprocessors, and GPUs. These PCEs may be internal to a heterogeneous system-on-a-chip (HSOC), external to the HSOC, or may be associated with a heterogeneous system implemented on multiple chips. These PCEs may be "hard-core" hardware elements dedicated to a task, or "soft-core" hardware elements created through automatic reconfiguration of resources to create a programmable communication element which is configured for a particular task, operation, communication protocol, or bus.

Figure 4A:
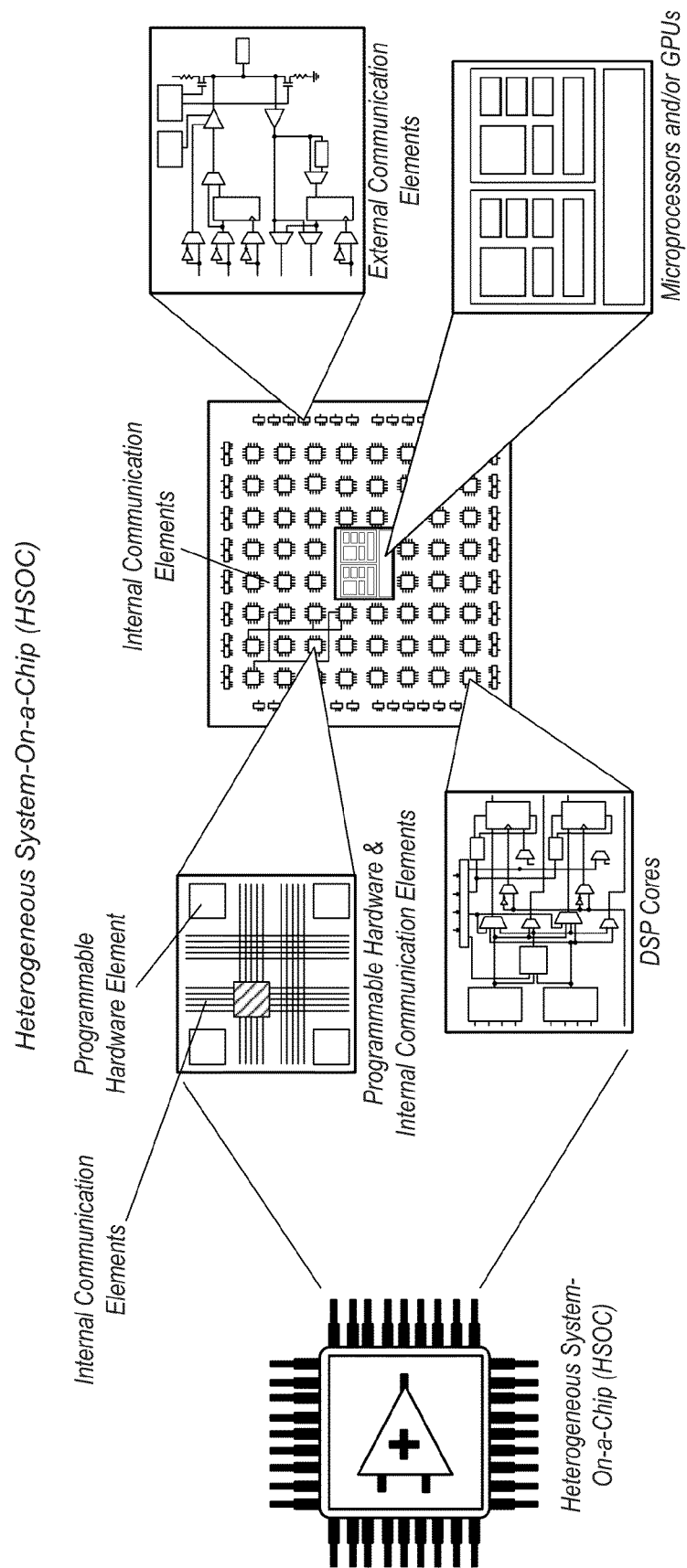
FIG. 4A illustrates an exemplary heterogeneous system-on-chip (SOC), according to one embodiment.

FIG. 4A illustrates an exemplary heterogeneous system in the form of a heterogeneous SOC, or HSOC. More specifically, the embodiment of FIG. 4A is a hybrid DSP/FPGA/uP (microprocessor) SOC. As may be seen, the HSOC includes programmable hardware, e.g., one or more programmable hardware elements, such as an FPGA fabric, one or more DSP cores, one or more microprocessors (uPs) and/or GPUs, and both internal and external programmable communication elements.

Figure 4B:
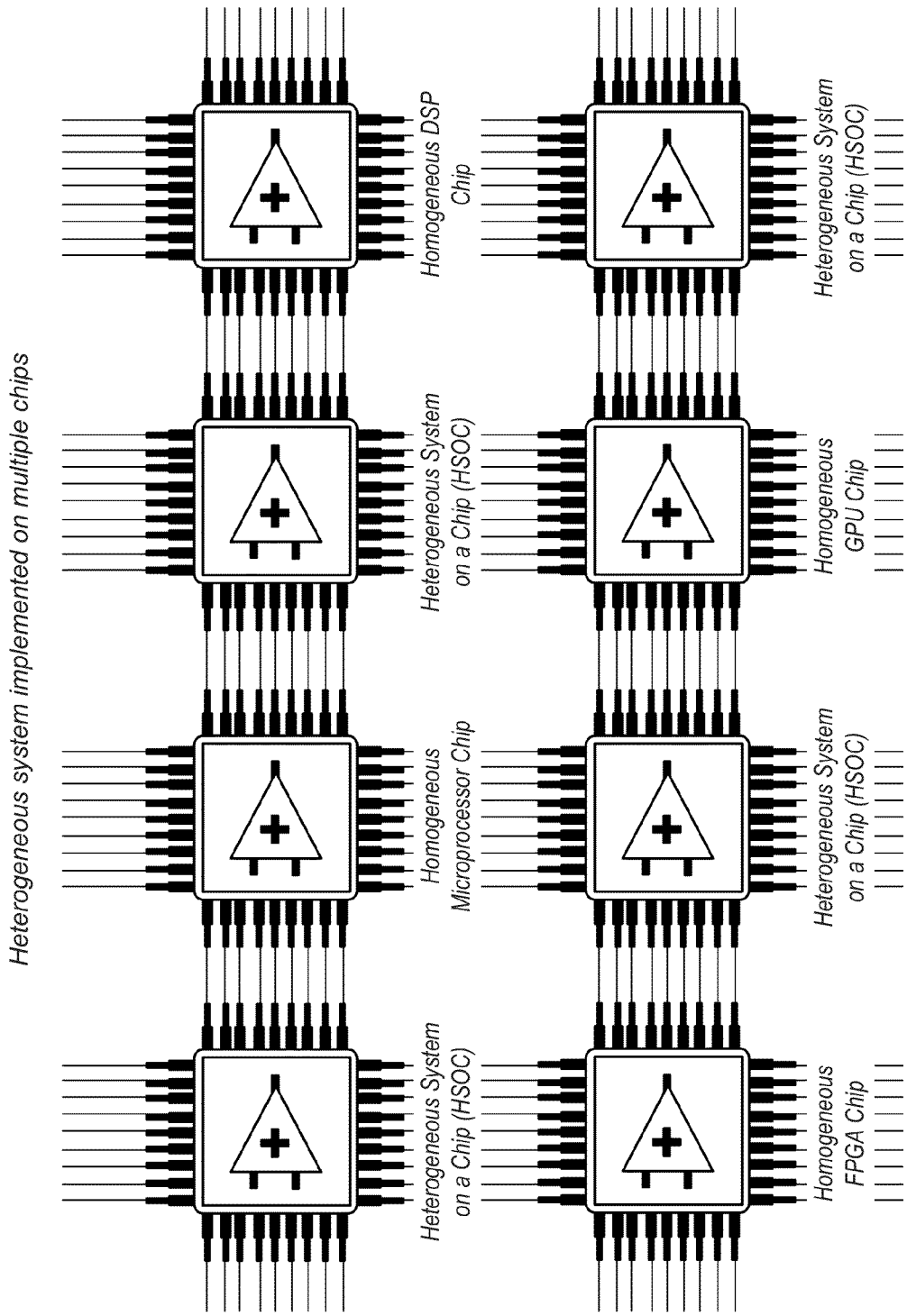
FIG. 4B illustrates an exemplary heterogeneous system implemented on multiple chips, according to one embodiment.

FIG. 4B illustrates another heterogeneous system that includes multiple SOCs, including both homogeneous SOCs and heterogeneous SOCs. More specifically, the embodiment of FIG. 4B includes three HSOCs, a homogeneous microprocessor chip, a homogeneous DSP chip, a homogeneous FPGA chip, and a homogeneous GPU (graphical processing unit) chip. As may be seen, the various components are communicatively coupled, and may be configured to execute a program in distributed fashion, as described below. Further exemplary heterogeneous systems are described below with reference to FIGS. 5A and 5B.

As noted above, in some embodiments the program may be a graphical program. The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW™ graphical programming development environment to create the graphical program.

In an alternate embodiment, the graphical program may be created in 3002 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument. In other embodiments, the program may be a textual program, e.g., in C, C++, JAVA, etc., as desired.

In some embodiments, the program may be generated from any of a variety of sources, e.g., at least one text-based program, other graphical diagrams, e.g., at least one simulation or model, at least one circuit diagram, at least one network diagram, or at least one statechart, among others.

Embodiments of the present invention may further include graphical data transfer and synchronization mechanisms that enable a plurality of targets executing floating-point math to simulate complex physical systems in which measurements, state-values, inputs, outputs, and parameters may be shared between targets and in graphical program embodiments, and may be represented using graphical floating-point programming constructs such as nodes, functions and wires. In other words, the graphical data transfer and synchronization mechanisms may be deployable to the heterogeneous hardware components, thereby enabling the heterogeneous hardware components implementing the floating-point math functionality to simulate physical systems in which measurements, state-values, inputs, outputs and parameters are shared between the heterogeneous hardware components.

Moreover, embodiments disclosed herein may provide the ability to generate floating-point graphical programming diagrams suitable for execution on programmable hardware, e.g., FPGA hardware, from any of a plurality of system modeling environments and languages, including for example, but not limited to, SPICE, Modelica, Mathscript, VHDL-AMS, and other languages used to capture model descriptions, and may further provide the ability to automatically generate and configure (e.g., graphical) floating-point code and graphical floating point memory references, event triggers and other (possibly graphical) programming constructs necessary for execution of the simulation models and math functions on the programmable hardware using (e.g., graphical) floating point programming, as well as in a desktop emulation context.

For example, in a graphical program implementation, at least some of the wires may represent a floating-point data type, and the plurality of nodes may include at least one node configured to asynchronously send one or more trigger events, measurements, parameters, state values and other data to an external FPGA. Thus, in some embodiments, the deployed program executing on the programmable hardware may be configured to receive and respond to programmatic events, such as events related to the state of floating-point values represented using graphical dataflow programming techniques and executed on programmable hardware or in a desktop emulation context.

In 3004, respective portions of the program may be automatically determined for deployment to respective ones of the heterogeneous hardware components, including automatically determining execution timing for the respective portions. In one embodiment, the respective portions may include a first portion targeted for deployment to the at least one programmable hardware element, and a second portion targeted for deployment to the at least one DSP core. Note that in other embodiments, portions of the program may be targeted for deployment to other heterogeneous hardware components, as desired.

In some embodiments, the timing of the communication between PCEs and the timing of execution of the portions of the programs on the heterogeneous hardware components may be automatically determined based on the nature of the way in which the program is targeted for distributed deployment on the system of heterogeneous hardware components. Alternately, the respective portions of the program for deployment to the heterogeneous hardware components may be determined automatically based on the timing of the communication between PCE and the timing of execution of the portions of the programs on the heterogeneous hardware components. In one embodiment that combines the automation of the above tasks, the determination of timing of the communication between PCEs, the determination of the timing of the execution of the portions of the programs on the heterogeneous hardware components, and the determination of portioning of the program for targeted distributed deployment to respective heterogeneous hardware components, may all be automatically determined.

In 3006, first program code implementing communication functionality (including timing functionality, possibly with constraints) between the heterogeneous hardware components, e.g., between the at least one programmable hardware element and the at least one DSP core, may be automatically generated. The first program code may be targeted for deployment to or on the at least one programmable communication element.

The at least one PCE may include one or more PCEs for internal communications between the at least one programmable hardware element and the at least one DSP core. In one embodiment, the at least one PCE may include at least one I/O block for communications between the at least one programmable hardware element or the at least one DSP core and external components or systems.

In 3008, at least one hardware configuration program may be automatically generated from the program and the first program code. The automatic generation of the hardware configuration program may include compiling the respective portions of the program and the first program code for deployment to respective ones of the heterogeneous hardware components. Thus, for example, the first portion of the program may be compiled for deployment to the at least one programmable hardware element, thereby generating a first portion of the at least one hardware configuration program, the second portion of the program may be compiled for deployment to the at least one DSP core, thereby generating a second portion of the at least one hardware configuration program, and the automatically generated first program code implementing communication functionality (including timing functionality) may be compiled for deployment to the at least one communication element, thereby generating a third portion of the at least one hardware configuration program.

The hardware configuration program may be deployable to the system, where after the deployment, the system may be configured to execute the program concurrently, e.g., in parallel, including the floating point math functionality. Thus, for example, in one embodiment, deploying the at least one hardware configuration program may include configuring the at least one programmable hardware element with the first portion of the at least one hardware configuration program, configuring the at least one DSP core with the second portion of the at least one hardware configuration program, and configuring the at least one communication element with the third portion of the at least one hardware configuration program. Accordingly, during execution the at least one programmable hardware element performs the functionality of the first portion of the program, the at least one DSP core performs the functionality of the second portion of the program, and the at least one communication element implements communication between the at least one programmable hardware element and the at least one DSP core. In other words, the at least one hardware configuration program may be used to configure the system to implement the functionality of the program (including the floating point math functionality), after which the system may be operable to perform the respective functionality via the heterogeneous hardware components concurrently, e.g., in parallel.

In some embodiments, the hardware configuration program may be directly converted into an FPGA program file describing a plurality of computing elements, including, for example, but not limited to, one or more of: fixed point FPGA fabric, floating point FPGA fabric, DSP cores, soft or hard-core microprocessors, graphics processing units (GPUs), or other heterogeneous computing elements which are integrated in one heterogeneous or homogenous chipset or multiple heterogeneous or homogenous chipsets.

Figure 5A:
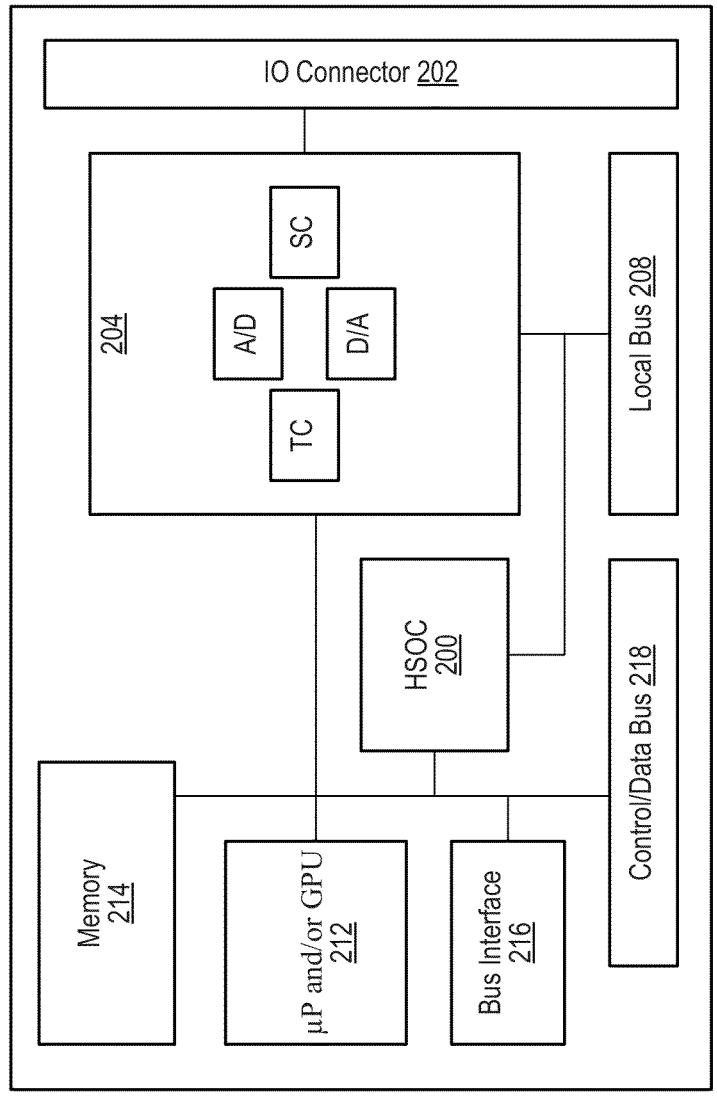
FIGS. 5A and 5B are block diagrams illustrating exemplary interface cards configured with heterogeneous programmable hardware, according to various embodiments of the present invention.
Figure 5B:
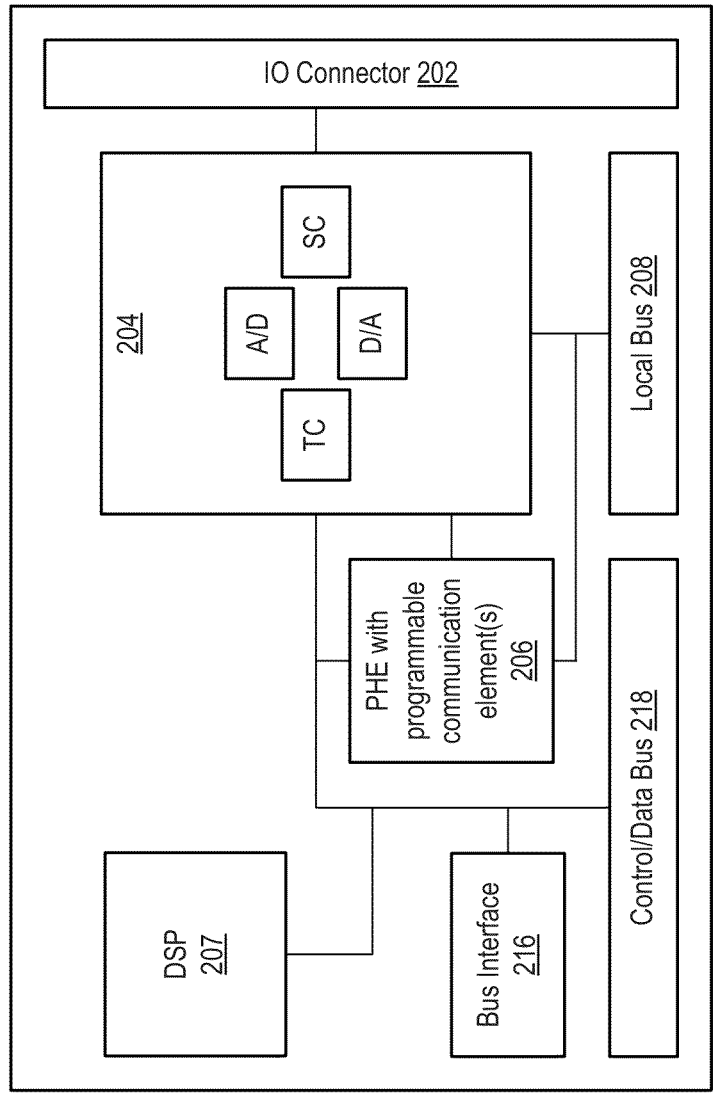

FIGS. 5A and 5B are high level block diagrams of further exemplary heterogeneous systems that may be configured according to embodiments of the present invention. More specifically, the systems of FIGS. 5A and 5B are exemplary interface cards configured with programmable hardware according to various embodiments of the present invention. It is noted that the embodiments shown in FIGS. 5A and 5B are exemplary only, and that an interface card or device configured with programmable hardware according to the present invention may have any of various architectures or forms, as desired. The interface cards illustrated in FIGS. 5A and 5B may be embodiments of the DAQ interface card 114 shown in either of FIG. 1A or 1B. However, as noted above, the programmable hardware may be included on any of the various devices shown in FIG. 1A or 1B, or on other devices, as desired.

As may be seen, in the embodiment of FIG. 5A, the interface card includes an HSOC 200, such as the HSOC of FIG. 4A. The card also includes an I/O connector 202 which is coupled for receiving signals. The I/O connector 202 may present analog and/or digital connections for receiving/providing analog or digital signals, respectively. The I/O connector 202 may further be adapted for coupling to SCXI conditioning logic 124 and 126 (see FIGS. 1A and 1B), or may be adapted to be coupled directly to a unit under test 130 or process 160.

As shown, the interface card may also include data acquisition (DAQ) logic 204, which may include analog to digital (A/D) converters, digital to analog (D/A) converters, timer counters (TC) and signal conditioning (SC) logic as indicated. The DAQ logic 204 may provide the data acquisition functionality of the DAQ card.

As shown, the interface card may further include bus interface logic 216 and a control/data bus 218. In one embodiment, the interface card is a PCI bus-compliant interface card adapted for coupling to the PCI bus of the host computer 102, or adapted for coupling to a PXI (PCI eXtensions for Instrumentation) bus. The bus interface logic 216 and the control/data bus 218 thus present a PCI or PXI interface.

The interface card 114 also includes local bus interface logic 208. In one embodiment, the local bus interface logic 208 presents a RTSI (Real Time System Integration) bus for routing timing and trigger signals between the interface card 114 and one or more other devices or cards.

The HSOC 200 is shown coupled to the DAQ logic 204 and also coupled to the local bus interface 208, as well as control/data bus 218. Thus a program can be created on the computer 82, or on another computer in a networked system, and at least a portion of the program can be converted into a hardware implementation form for execution on or by the HSOC 200. The portion of the program converted into a hardware implementation form is preferably a portion which requires fast and/or real-time execution.

In the embodiment of FIG. 5A, the interface card further includes a dedicated on-board microprocessor (μP) and/or GPU 212 and memory 214. This enables a portion of the program to be compiled into machine language for storage in the memory 214 and execution by the microprocessor 212. This may be in addition to a portion of the program being converted into a hardware implementation form for the HSOC 200. Thus, in one embodiment, after a program has been created, a portion of the program may be compiled for execution on the embedded microprocessor 212 and may execute locally on the interface card via the microprocessor 212 and memory 214, and a other portions of the program may be translated or converted into a hardware executable format and downloaded to the HSOC 200 for hardware implementation, as described in more detail herein.

Turning now to FIG. 5B, in this exemplary embodiment, the HSOC 200, microprocessor 212, and memory 214 are not included on the interface card; rather, a DSP core 207 and a programmable hardware element, e.g., an FPGA, (206) with at least one programmable communication element (PCE) are included, and thus only the portions of the program which are converted into hardware implementation form are downloaded to the card, specifically, to the programmable hardware element (e.g., FPGA) 206, the programmable communication element(s), and the DSP core 207. Thus in the embodiment of FIG. 5B, any supervisory control portion of the program which is necessary or desired to execute in machine language on a programmable CPU may be executed by the host CPU in the computer system 102 or some other processor communicatively coupled to the card, not executed locally by a CPU on the interface card.

Further Exemplary Embodiments

The following presents various further exemplary embodiments of the present invention, although these embodiments are not intended to limit the invention or its application to any particular implementation or use.

In one embodiment, the system may include a host computer and a measurement device having a programmable hardware element. The programmable hardware element may be configured to perform a loop to acquire floating point data from a physical system measurement or a measurement from a system simulated in the programmable hardware element using (possibly graphical) floating-point programming constructs, or both. The host computer may be configured to perform another loop to read the simulated and/or physical measurement data from the programmable hardware element and use the measurement data in a simulation, measurement and control algorithm. The host computer or measurement device may be further configured to perform a synchronization algorithm to keep the simulation and physical measurement data acquisition loop performed by the programmable hardware element synchronized with a measurement, simulation, and control loop performed by the host computer. In some embodiments, the system may include a plurality of FPGA devices and a plurality of host computers.

In another embodiment, the system may be configured (e.g., by the program) to implement communication of floating point data between a first programmable hardware element or computer and a second programmable hardware element or computer over a direct digital connection.

Some embodiments may be implemented at the chip level. For example, in one embodiment, the system may include a heterogeneous system on a chip (see, e.g., FIG. 5A). In another embodiment, the system may include a heterogeneous system implemented on multiple chips (see, e.g., FIG. 5B). The at least one PCE may be configurable for intra-chip communications or inter-chip communications.

In one embodiment, the method may include automatically deploying the hardware configuration program to the system.

In some embodiments, the program may include multiple models of computation, e.g., different portions of the program may operate in accordance with different models of computation, e.g., data flow, control flow, procedural, declarative, and so forth, as desired. In one embodiment, the program may include code (e.g., graphical program code or structures) directed to multiple different physical domains, e.g., code simulating or related to one or more of electrical power, electronics, hydrodynamics, chemistry, physics, thermodynamics, among others, as desired.

It should be noted that any of the techniques disclosed herein or described in any of the references incorporated by reference above may be used in any combinations desired.

Figure 6:
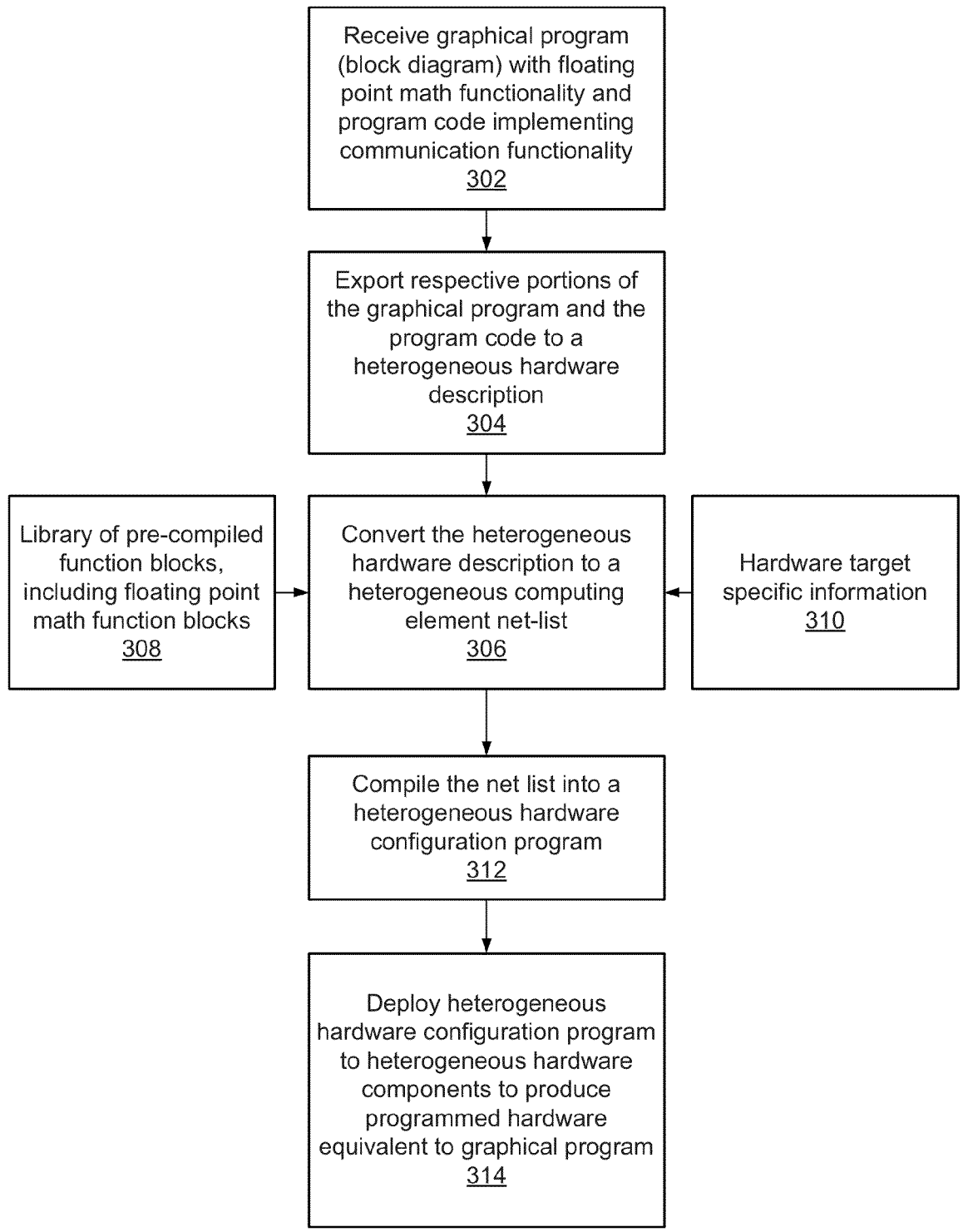
FIG. 6 is a high level flowchart diagram illustrating conversion of a program to a heterogeneous hardware implementation, according to one embodiment.

FIG. 6—Conversion of Graphical Code into a Heterogeneous Hardware Implementation Referring now to FIG. 6, a flowchart diagram is shown illustrating one embodiment of the present invention where the program is a graphical program, although it should be noted that the graphical program implementation is exemplary only, and that the method elements of FIG. 6 are also applicable to text based (i.e., textual) programs and/or combinations of textual and graphical programs. Below is described a computer-implemented method for generating heterogeneous hardware implementations of graphical programs or graphical code with floating point math functionality; however, it should be noted that the techniques disclosed are also applicable to textual programs, the graphical embodiments being exemplary only. In various embodiments, some of the method elements shown may be performed concurrently, in a different order than shown, or may be omitted. Additional method elements may also be performed as desired. As shown, the method may operate as follows.

The method below presumes that a graphical programming development system is stored in the memory of the computer system for creation of graphical programs with floating point math functionality. However, it should be noted that other functionality may also be included in the graphical program, e.g., fixed point math functionality, etc. In one embodiment, the graphical programming system is the LabVIEW graphical programming system available from National Instruments. In this system, the user may create the graphical program in a graphical program editor, e.g., via a graphical program panel, referred to as a block diagram window, and also creates a user interface in a graphical front panel. The graphical program is sometimes referred to as a virtual instrument (VI). The graphical program or VI will typically have a hierarchy of sub-graphical programs or sub-VIs.

As shown, in step 302 the user first receives (or creates) a graphical (or textual) program, also sometimes referred to as a block diagram. In one embodiment, the graphical program comprises a graphical data flow diagram which specifies functionality of the program to be performed. This graphical data flow diagram is preferably directly compilable into machine language code for execution on a computer system. In some exemplary embodiments, the graphical program may include floating point functionality and program code implementing communication functionality, including timing functionality.

In step 304 the method operates to export at least a portion of the graphical program (with floating point math functionality) to a heterogeneous hardware description. Thus, after the user has created a graphical program in step 302, the user selects an option to export a portion of the graphical program to a heterogeneous hardware description. The hardware description may be a VHDL description, e.g., a VHDL source file, or alternatively may be a high level net list description. The heterogeneous hardware description comprises a high level hardware description of floating point function blocks, logic, inputs, and outputs which perform the operation indicated by the graphical program. The operation of exporting at least a portion of a graphical program to a hardware description is discussed in more detail with the flowchart of FIG. 9.

As noted above, in some embodiments, the determination of respective portions of the graphical (or textual) program targeted to respective hardware components of the system may be automatic. In other words, the method may automatically partition the graphical program into respective portions for deployment to the respective hardware components.

Alternatively, in one embodiment, during creation of the graphical program in step 302 the user specifies portions, e.g., sub VIs, which are to be exported to the heterogeneous hardware description format for conversion into a hardware implementation. In another embodiment, when the user selects the option to export a portion of the graphical program to the heterogeneous hardware description format, the user selects which modules or sub-VIs at that time that are to be exported to the heterogeneous hardware description.

In step 306 the method may operate to convert the heterogeneous hardware description into an FPGA-specific net list. The net list describes the components required to be present in the hardware as well as their interconnections. Conversion of the heterogeneous hardware description into the FPGA-specific net list may be performed by any of various types of commercially available synthesis tools, such as those available from Xilinx, Altera, etc., among others.

In one embodiment, the converting step 306 may utilize one or more pre-compiled function blocks from a library of pre-compiled function blocks 308. Thus, for certain function blocks which are difficult to compile, or less efficient to compile, from a hardware description into a net list format, the hardware description created in step 304 includes a reference to a pre-compiled function block from the library 308. The respective pre-compiled function blocks are simply inserted into the net list in place of these references in step 306. This embodiment of the invention thus includes the library 308 of pre-compiled function blocks which are used in creating the net list. This embodiment also includes hardware target specific information 310 which is used by step 306 in converting the hardware description into a net list which is specific to a certain type or class of FPGA.

In step 312 the method operates to compile the net list into at least one heterogeneous hardware configuration program, e.g., an FPGA program file, also referred to as a software bit stream. The at least one heterogeneous hardware configuration program is a file that can be readily downloaded to program the heterogeneous hardware components, e.g., an FPGA and other heterogeneous or homogeneous programmable hardware devices, e.g., computing devices, such as a heterogeneous system-on-chip (SOC) devices containing a plurality of computing elements (e.g., heterogeneous programmable hardware components).

After the net list has been compiled into at least one heterogeneous hardware configuration program (e.g., an FPGA program file) in step 312, then in step 314 the method may transfer the at least one heterogeneous hardware configuration program (e.g., the FPGA program file) to the programmable hardware, e.g., the FPGA and other programmable hardware components, to produce programmed hardware equivalent to the graphical program. Thus, upon completion of step 314, the portion of a graphical program referenced in step 304 is comprised as a hardware implementation in the heterogeneous system, e.g., in an FPGA and/or other programmable hardware element, and/or other programmable hardware components of the system.

It is noted that various of the above steps can be combined and/or can be made to appear invisible to the user. For example, steps 306 and 312 can be combined into a single step, as can steps 304 and 306. In one embodiment, after the user creates the graphical program in step 302, the user simply selects a hardware export option, and indicates the heterogeneous hardware targets or destinations, causing steps 304-314 to be automatically performed.

Figure 7:
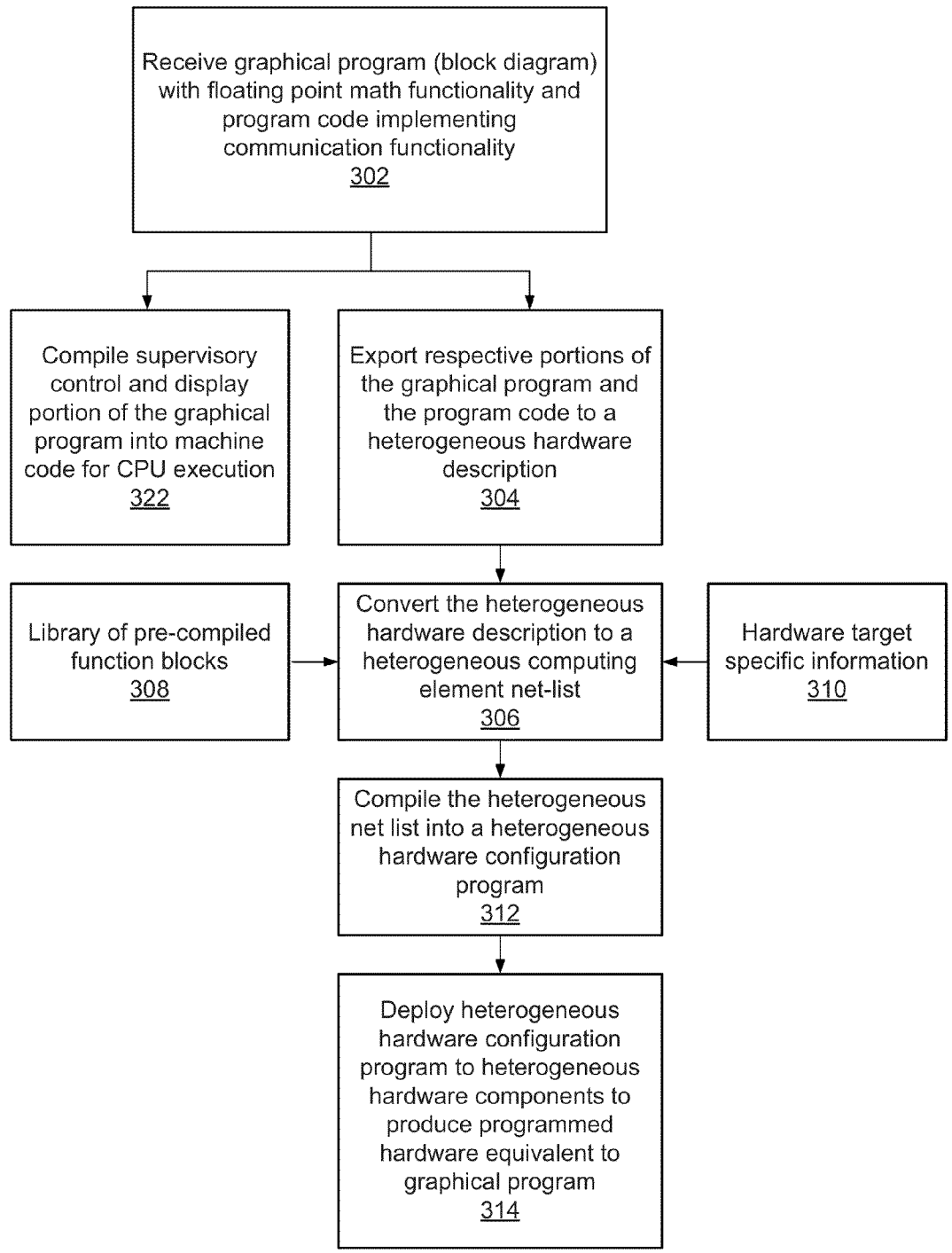
FIG. 7 is a more detailed flowchart diagram illustrating conversion of a program to a heterogeneous hardware implementation, including compiling a first portion of the program into machine language and converting a second portion of the program into a heterogeneous hardware implementation.

FIG. 7—Conversion of a Graphical Program into Machine Language and Hardware Implementations FIG. 7 is a more detailed flowchart diagram illustrating one embodiment of the invention, including compiling a first portion of the graphical program into machine language and converting a second portion of the graphical program into a hardware implementation. As with the above methods, while the embodiments described may be in terms of a graphical program, it should be noted that the graphical program implementation is exemplary only, and that the techniques of FIG. 7 are also applicable to text based (i.e., textual) programs and/or combinations of textual and graphical programs.

As shown in FIG. 7, after the user has created (and/or received) a graphical program in step 302, the user can optionally select a first portion to be compiled into machine code for CPU execution as is normally done. In one embodiment, the user preferably selects a supervisory control and display portion of the graphical program to be compiled into machine code for a CPU execution. The first portion comprising supervisory control and display portions is compiled for execution on a CPU, such as the host CPU in the computer 102 or the CPU 212 comprised on the interface card 114. This enables the supervisory control and display portions to execute on the host CPU, which is optimal for these elements of the program.

The user selects a second portion for conversion to hardware implementation, which is performed as described above in steps 304-314 of FIG. 6. The portion of the graphical program which is desired for hardware implementation preferably comprises modules or VIs which require a fast or deterministic implementation and/or are desired to execute in a stand-alone hardware unit. In general, portions of the graphical program which are desired to have a faster or more deterministic execution are converted into the hardware implementation. In one embodiment, the entire graphical program is selected for conversion to a hardware implementation, and thus step 322 is not performed.

Figure 8:
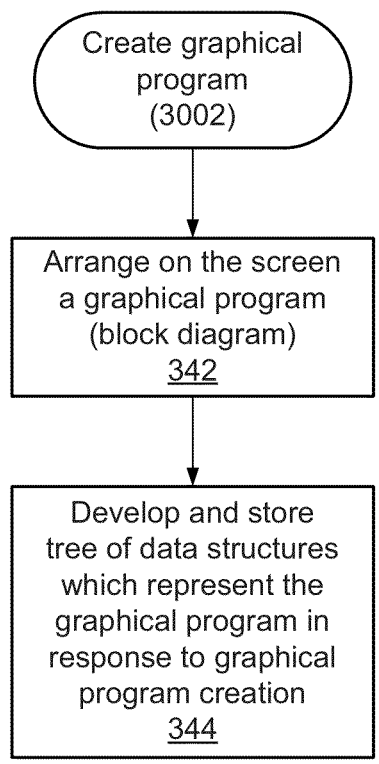
FIG. 8 is a flowchart diagram illustrating creation of a graphical program, according to one embodiment.

FIG. 8—Creation of a Graphical Program

FIG. 8 is a more detailed flowchart diagram of step 302 of FIGS. 6 and 7, illustrating creation of a graphical program according to one embodiment of the invention. As shown, in step 342 the user arranges on the screen a graphical program or block diagram. This includes the user placing and connecting, e.g., wiring, various icons or nodes on the display screen in order to configure a graphical program. More specifically, the user selects various function icons or other icons and places or drops the icons in a block diagram panel, and then connects or "wires up" the icons to assemble the graphical program. The user also preferably assembles a user interface, referred to as a front panel, comprising controls and indicators which indicate or represent input/output to/from the graphical program. For more information on creating a graphical program in the LabVIEW graphical programming system, please refer to the LabVIEW system available from National Instruments as well as the above patent applications incorporated by reference.

In response to the user arranging on the screen a graphical program, the method operates to develop and store a tree of data structures which represent the graphical program. Thus, as the user places and arranges on the screen function nodes, structure nodes, input/output terminals, and connections or wires, etc., the graphical programming system operates to develop and store a tree of data structures which represent the graphical program. More specifically, as the user assembles each individual node and wire, the graphical programming system operates to develop and store a corresponding data structure in the tree of data structures which represents the individual portion of the graphical program that was assembled. Thus, steps 342 and 344 are an iterative process which are repetitively performed as the user creates the graphical program.

Figure 9:
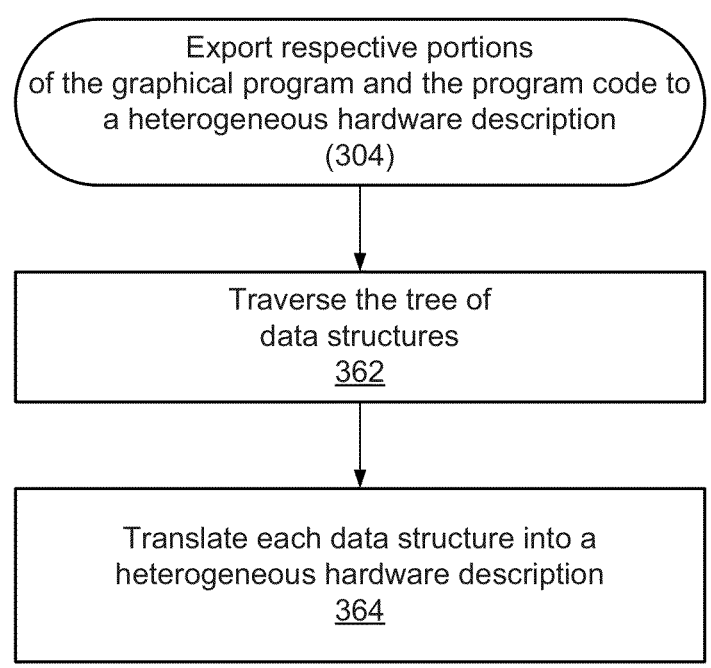
FIG. 9 is a flowchart diagram illustrating exporting at least a portion of a graphical program to a hardware description, according to one embodiment.

FIG. 9—Exporting a Portion of the Graphical Program to a Hardware Description

FIG. 9 is a flowchart diagram of step 304 of FIGS. 6 and 7, illustrating operation when the method exports a portion of the graphical program into a hardware description. As with the above methods, while the embodiments described may be in terms of a graphical program, it should be noted that the graphical program implementation is exemplary only, and that the techniques of FIG. 9 are also applicable to text based (i.e., textual) programs and/or combinations of textual and graphical programs.

The tree of data structures created and stored in step 344 preferably comprises a hierarchical tree of data structures based on the hierarchy and connectivity of the graphical program. As shown, in step 362 the method traverses the tree of data structures and in step 364 the method operates to translate each data structure into a hardware description format. In one embodiment, the method first flattens the tree of data structures prior to traversing the tree in step 362.

In the present embodiment, a number of different function icons and/or primitives can be placed in a diagram or graphical program for conversion into a hardware implementation. These primitives include, but are not limited to, function nodes, constants, global variables, control and indicator terminals, structure nodes, and sub-VIs, etc. Function icons or primitives can be any data type, but in the current embodiment are limited to Integer or Boolean data types. Also, global variables are preferably comprised on a single global panel for convenience. If a VI appears multiple times, then the VI is preferably re-entrant and may have state information. If a VI is not re-entrant, then preferably multiple copies of the VI are created in hardware if the VI has no state information, otherwise it would be an error.

In one embodiment, each node which is converted to a hardware description includes an Enable input, a Clear_Enable signal input, a master clock signal input and an Enable_Out or Done signal. The Enable input guarantees that the node executes at the proper time, i.e., when all of its inputs have been received. The Clear_Enable signal input is used to reset the node if state information remembers that the node was done. The Enable_Out or Done signal is generated when the node completes and is used to enable operation of subsequent nodes which receive an output from the node. Each node which is converted to a hardware description also includes the data paths depicted in the graphical program.

For While loop structures, Iteration structures, Sequence structures, and Case Structures, the respective structure is essentially abstracted to a control circuit or control block. The control block includes a diagram enable out for each sub-diagram and a diagram done input for each sub-diagram.

In addition to the above signals, e.g., the Enable input, the Clear_Enable signal input, the master clock signal input, and the Enable_Out or Done signal, all global variables have numerous additional signals, including CPU interface signals which are specific to the type of CPU and bus, but typically include data lines, address lines, clock, reset and device select signals. All VIs and sub-VIs also include CPU interface signals if they contain a global variable.

In one embodiment, when an icon is defined for a VI used solely to represent a hardware resource connected to the FPGA, e.g., an A/D converter, with a number of inputs and outputs, a string control is preferably placed on the front panel labeled VHDL. In this case, the default text of the string control is placed in the text file created for the VHDL of the VI. Thus, in one embodiment, a library of VIs are provided each representing a physical component or resource available in or to the FPGA. As these VHDL files representing these VIs are used, the method of the present invention monitors their usage to ensure that each hardware resource is used only once in the hierarchy of VIs being exported to the FPGA. When the VHDL file is written, the contents of the string control are used to define the access method of that hardware resource.

The following is pseudo-code which describes the operations performed in the flowchart of FIG. 9:

```
GenCircuit (vi)
        send GenCircuit to top level diagram of vi
Diagram:GenCircuit(d)
    send GenCircuit to each constant in d
    send GenCircuit to each node in d
        send GenCircuit to each signal in d
Signal: GenCircuit(s)
    declare type of signal s
BasicNode:GenCircuit(n)
    declare type of component needed for n
    declare AND-gate for enabling n (if needed)
    list connections for all node inputs
    list connections for all inputs to enabling AND-gate (if needed)
Constant:GenCircuit(c)
    declare type and value of constant c
WhileLoopNode:GenCircuit(n)
    declare while loop controller component
    declare AND-gate for enabling n (if needed)
    list connections for all node inputs
    list connections for all inputs to enabling AND-gate (if needed)
    declare type of each shift register component
    list connections for all inputs to all shift registers
    declare type of each tunnel component
    list connections for all inputs to all tunnels
CaseSelectNode:GenCircuit (n)
    declare case select controller component
    declare AND-gate for enabling n (if needed)
    list connections for all node inputs
    list connections for all inputs to enabling AND-gate (if needed)
    declare type of each tunnel component
    list connections for all inputs to all tunnels
SequenceNode:GenCircuit (n)
    declare sequence controller component
    declare AND-gate for enabling n (if needed)
    list connections for all node inputs
    list connections for all inputs to enabling AND-gate (if needed)
    declare type of each tunnel component
    list connections for all inputs to all tunnels
SubVINode:GenCircuit (n)
    send GenCircuit to the subVI of n
        associate inputs & outputs of subVI with those of n
    declare AND-gate for enabling n (if needed)
    list connections for all node inputs
    list connections for all inputs to enabling AND-gate (if needed)
```

Referring to the above pseudo code listing, the method starts at the VI level (the top level) and begins generation of VHDL by sending a message to the top level diagram. The method in turn effectively provides a message from the diagram to each constant, each node, and each signal in the diagram.

For signals, the method then declares the signal type.

For basic nodes, the method declares a type of the component needed, and also declare an AND-gate with the proper number of inputs needed in order to enable itself. In other words, basic nodes declare an AND-gate with a number of inputs corresponding to the number of inputs received by the node. Here, optimization is preferably performed to minimize the number of inputs actually needed. For example, if a node has three inputs, the node does not necessarily need a three input AND-gate if two of those inputs are coming from a single node. As another example, if one input comes from node A and another input comes from node B, but node A also feeds node B, then the input from node A is not needed in the AND gate. Thus various types of optimization are performed to reduce the number of inputs to each AND gate. For the basic node, the method also lists the connections for all of its inputs as well as the connections for all inputs to the enabling AND-gate.

For a constant, the method simply declares the type and the value of the constant.

For a While loop, the method declares a While loop controller component. The method also declares an AND-gate, lists AND-gate inputs, and lists node inputs in a similar manner to the basic node described above. The method then declares the type for each shift register and includes a component for the shift register, and lists all the connections for the shift register inputs. If any tunnels are present on the While loop, the method declares the type of each tunnel component and list the connections for the inputs to the tunnels. For most tunnels, the method simply equivalences the signals for the inside and outside, without any effect.

The method proceeds in a similar manner for Case and Sequence structures. For Case and Sequence structures, the method declares a case select controller component or a sequence controller component, respectively. For both Case and Sequence structures, the method also declares an AND-gate, lists AND-gate inputs, and lists node inputs in a similar manner to the basic node described above. The method then declares the component needed for any tunnels and list the connections for the inputs to the tunnels.

For a sub-VI, the method sends a message to the sub-VI and associates inputs and outputs of the sub-VI with those of n. The method then declares an AND-gate, lists AND-gate inputs, and lists node inputs in a similar manner to the basic node described above.

Figure 10:
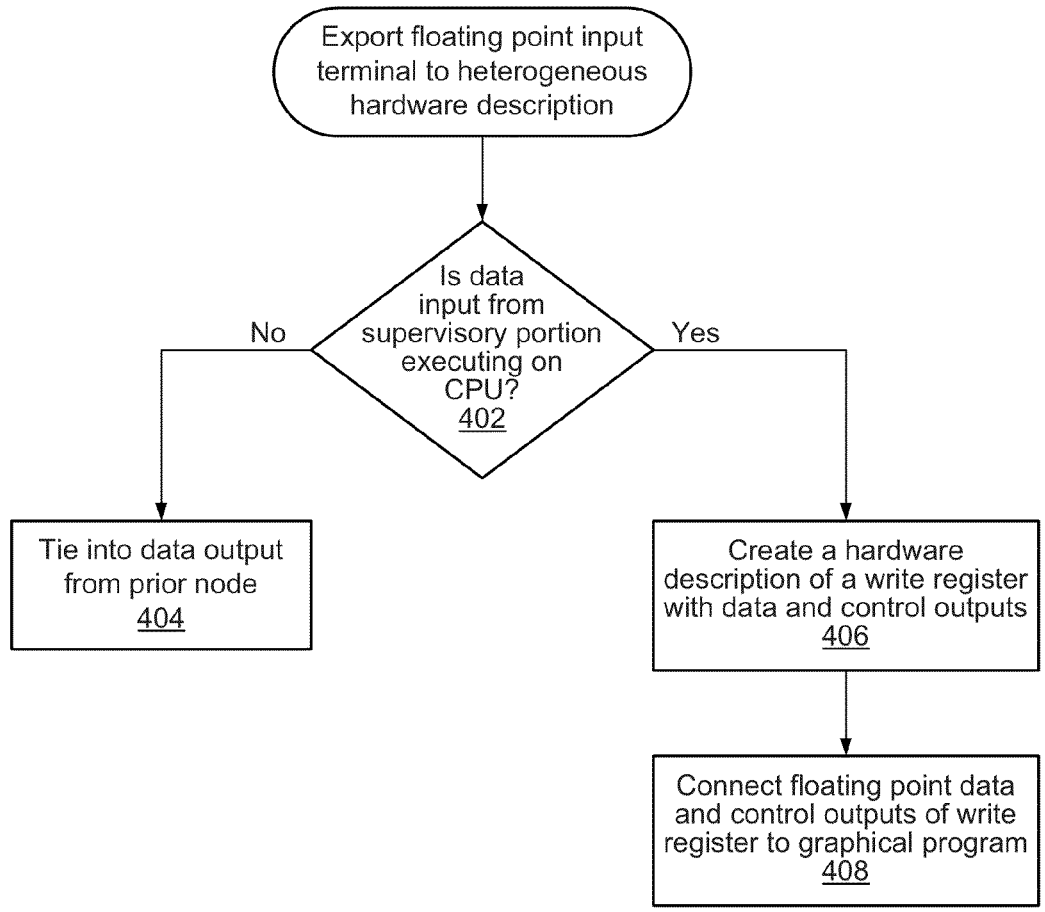
FIG. 10 is a flowchart diagram illustrating exporting a floating point input terminal into a heterogeneous hardware description, according to one embodiment.

FIG. 10—Exporting an Input Terminal into a Hardware Description

FIG. 10 is a flowchart diagram illustrating operation when the method exports an input terminal into the hardware description format. As shown, in step 402 the method determines if the data provided to the input terminal is input from a portion of the graphical program which will be executing on the CPU, i.e., the portion of the graphical program which is to be compiled into machine language for execution on the CPU, or whether the data is input from another portion of the graphical program that is also being transformed into a hardware implementation. As with the above methods, while the embodiments described may be in terms of a graphical program (e.g., graphical program terminals), it should be noted that the graphical program implementation is exemplary only, and that the techniques of FIG. 10 are also applicable to text based (i.e., textual) programs and/or combinations of textual and graphical programs. For example, instead of "terminals", a text based program implementation may be directed to input/output argument lists of text based functions or programs.

As shown, if the data input to the input terminal is determined in step 402 to be input from a portion of the graphical program being compiled for execution on the CPU, in step 406 the method creates a hardware description of a write register with a data input and data and control outputs. The write register is operable to receive data transferred by the host computer, i.e., generated by the compiled portion executing on the CPU. In step 408 the data output of the write register is connected for providing data output to other elements in the graphical program portion. In step 408 the control output of the write register is connected to other elements in the graphical program portion for controlling sequencing of execution, in order to enable the hardware description to have the same or similar execution order as the graphical program.

If the data is determined to not be input from a portion being compiled for execution on the CPU step in 402, i.e., the data is from another node in the portion being converted into a hardware implementation, then in step 404 the method ties the data output from the prior node into this portion of the hardware description, e.g., ties the data output from the prior node into the input of dependent sub-modules as well as control path logic to maintain the semantics of the original graphical program.

Figure 11:
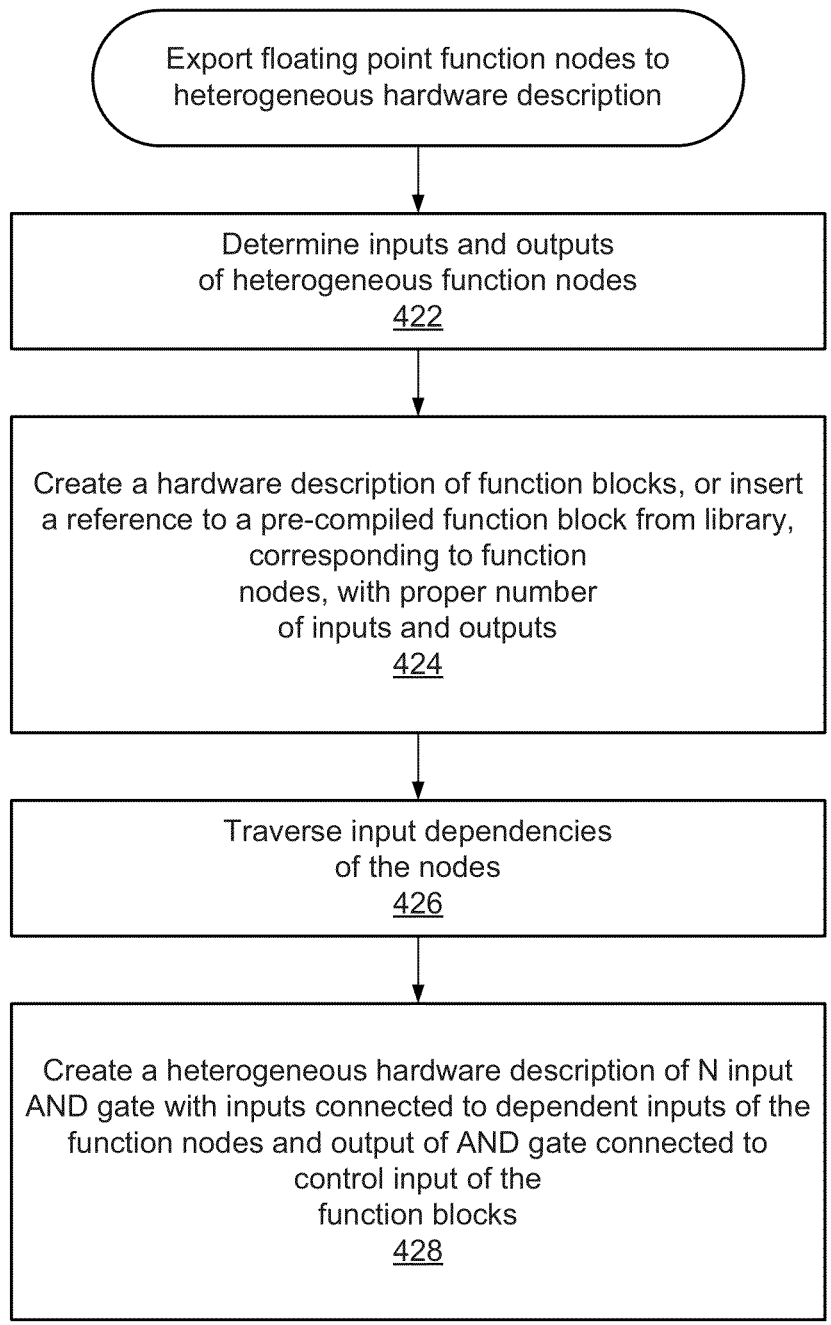
FIG. 11 is a flowchart diagram illustrating exporting floating point function nodes into a heterogeneous hardware description, according to one embodiment.

FIG. 11—Exporting a Function Node into a Hardware Description

FIG. 11 is a flowchart diagram illustrating operation where the method exports a function node into the hardware description format. In one embodiment, the term "function node" refers to any various types of icons or items which represent a function being performed. Thus, a function node icon represents a function being performed in the graphical program. Examples of function nodes include arithmetic function nodes, e.g., add, subtract, multiply, and divide nodes, trigonometric and logarithmic function nodes, comparison function nodes, conversion function nodes, string function nodes, array and cluster function nodes, file I/O function nodes, etc. As with the above methods, while the embodiments described may be in terms of a graphical program, it should be noted that the graphical program implementation is exemplary only, and that the techniques of FIG. 11 are also applicable to text based (i.e., textual) programs and/or combinations of textual and graphical programs.

As shown in FIG. 11, in step 422 the method determines the inputs and outputs of the function node. In step 424 the method creates a hardware description of the function block corresponding to the function node with the proper number of inputs and outputs as determined in step 422. Alternatively, in step 424 the method includes a reference in the hardware description to a pre-compiled function block from the library 308. In this case, the method also includes the determined number of inputs and outputs of the function node.

In step 426 the method traverses the input dependencies of the node to determine which other nodes provide outputs that are provided as inputs to the function node being converted. In step 428 the method creates a hardware description of an N input AND gate, wherein N is the number of inputs to the node, with each of the N inputs connected to control outputs of nodes which provide inputs to the function node. The output of the AND gate is connected to a control input of the function block corresponding to the function node.

In the data flow diagramming model of one embodiment, a function node can only execute when all of its inputs have been received. The AND gate created in step 428 emulates this function by receiving all control outputs of nodes which provide inputs to the function node. Thus the AND gate operates to effectively receive all of the dependent inputs that are connected to the function node and AND them together to provide an output control signal which is determinative of whether the function node has received all of its inputs. The output of the AND gate is connected to the control input of the function block and operates to control execution of the function block. Thus, the function block does not execute until the AND gate output provided to the control input of the function block provides a logic signal indicating that all dependent inputs which are input to the function node have been received.

Figure 12:
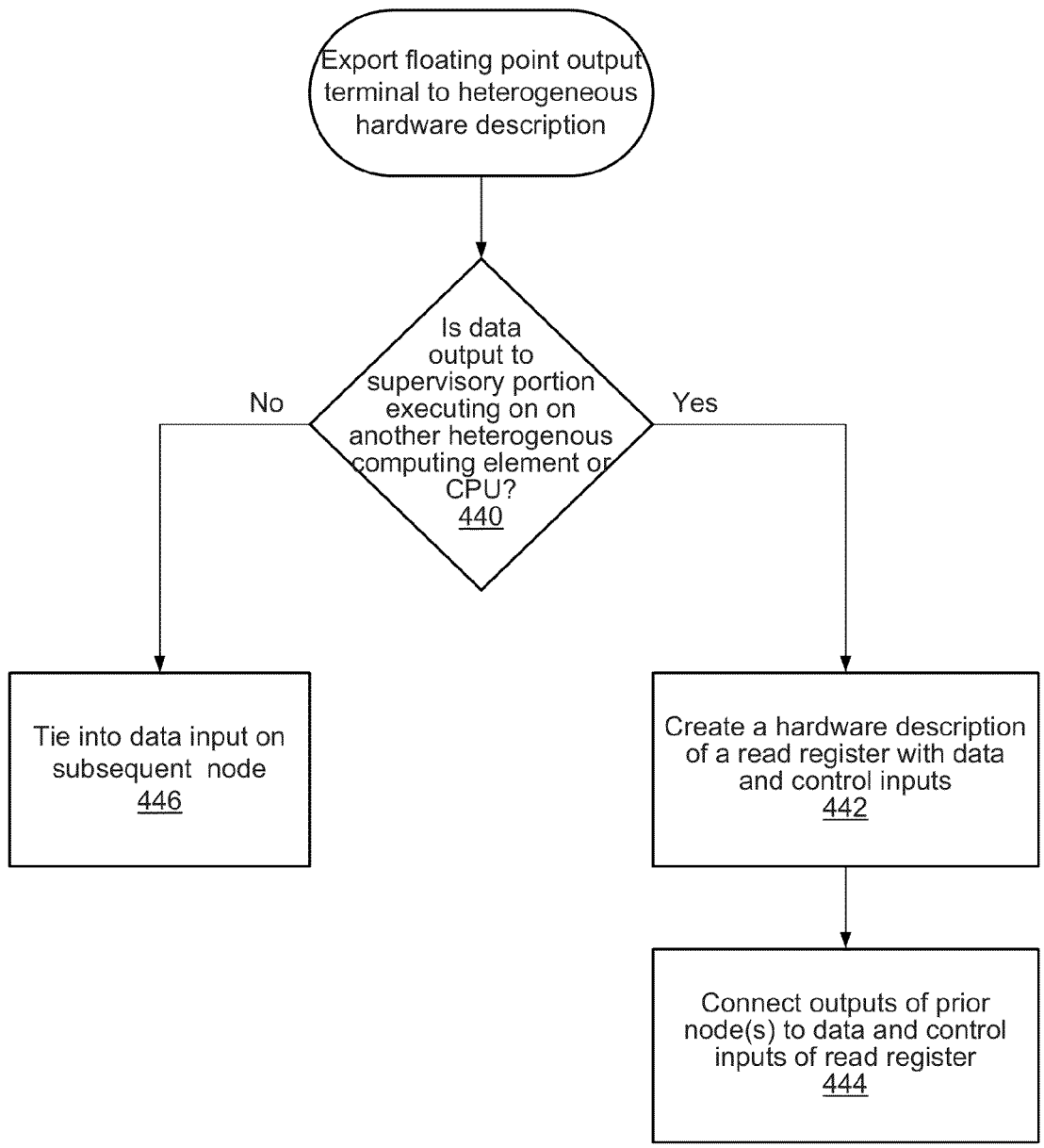
FIG. 12 is a flowchart diagram illustrating exporting a floating point output terminal into a heterogeneous hardware description, according to one embodiment.

FIG. 12—Exporting an Output Terminal into a Hardware Description

FIG. 12 is a flowchart diagram illustrating operation where the method exports an output terminal into the hardware description. As shown, in step 440 the method determines if the data provided from the output terminal is output to a portion of the graphical program which will be executing on the CPU, i.e., the portion of the graphical program which is to be compiled into machine language for execution on the CPU, or whether the data is output to another portion of the graphical program that is also being transformed into a hardware implementation. As with the above methods, while the embodiments described may be in terms of a graphical program, it should be noted that the graphical program implementation is exemplary only, and that the techniques of FIG. 12 are also applicable to text based (i.e., textual) programs and/or combinations of textual and graphical programs. For example, instead of "terminals", a text based program implementation may be directed to input/output argument lists of text based functions or programs.

As shown, if the data output from the output terminal is determined in step 440 to be output to a portion of the graphical program being compiled for execution on the CPU, then in step 442 the method creates a hardware description of a read register with a data input and data and control outputs. The read register is operable to receive data generated by logic representing a prior node in the graphical program.

In step 444 the method connects the data output of a prior node to the data input of the read register. In step 444 the control input of the read register is also connected to control sequencing of execution, i.e., to guarantee that the read register receives data at the proper time. This enables the hardware description to have the same or similar execution order as the graphical program.

If the data is determined to not be output to a portion being compiled for execution on the CPU step in 440, i.e., the data is to another node in the portion being converted into a hardware implementation, then in step 446 the method ties the data output from the output terminal into a subsequent node in this portion of the hardware description, e.g., ties the data output from the output terminal into the input of subsequent sub-modules as well as control path logic to maintain the semantics of the original graphical program.

Figure 13:
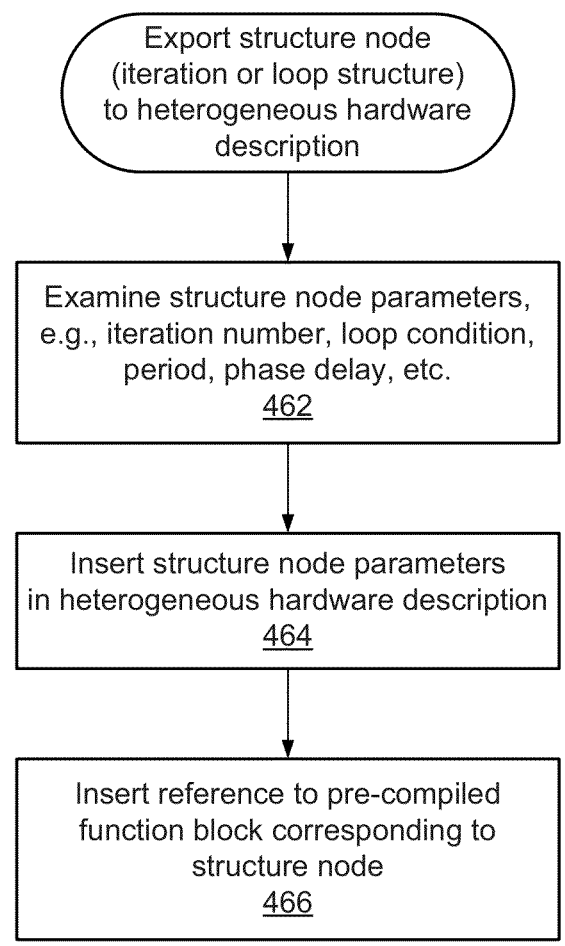
FIG. 13 is a flowchart diagram illustrating exporting a structure node into a heterogeneous hardware description, according to one embodiment.

FIG. 13—Exporting a Structure Node into a Hardware Description

FIG. 13 is a flowchart diagram illustrating operation where the method exports a structure node into the hardware description. In one embodiment, the term "structure node" refers to a node which represents control flow of data, including iteration, looping, sequencing, and conditional branching. Examples of structure nodes include For/Next loops, While/Do loops, Case or Conditional structures, and Sequence structures. For more information on structure nodes, please see the above LabVIEW patents referenced above. As with the above methods, while the embodiments described may be in terms of a graphical program, it should be noted that the graphical program implementation is exemplary only, and that the techniques of FIG. 13 are also applicable to text based (i.e., textual) programs and/or combinations of textual and graphical programs. For example, instead of a "structure node", a text based program implementation may be directed to corresponding text based software functions or structures.

The flowchart of FIG. 13 illustrates exporting a loop structure node into a hardware description. As shown, in step 462 the method examines the structure node parameters, e.g., the iteration number, loop condition, period, phase delay, etc. As discussed above, the graphical programming system preferably allows the user to insert certain parameters into a structure node to facilitate exporting the structure node into a hardware description. Iteration and looping structure nodes have previously included an iteration number and loop condition, respectively. According to one embodiment of the invention, these structure nodes further include period and phase delay parameters, which are inserted into or assigned to the structure node. These provide information on the period of execution and the phase delay of the structure node. As discussed below, the period and phase delay parameters, as well as the iteration number or loop condition, are used to facilitate exporting the structure node into a hardware description.

In step 464, the method inserts the structure node parameters into the hardware description. In step 466 the method inserts a reference to a pre-compiled function block corresponding to the type of structure node. In the case of a looping structure node, the method inserts a reference to a pre-compiled function block which implements the looping function indicated by the structure node. The method also connects controls to the diagram enclosed by the structure node.

Figure 14:
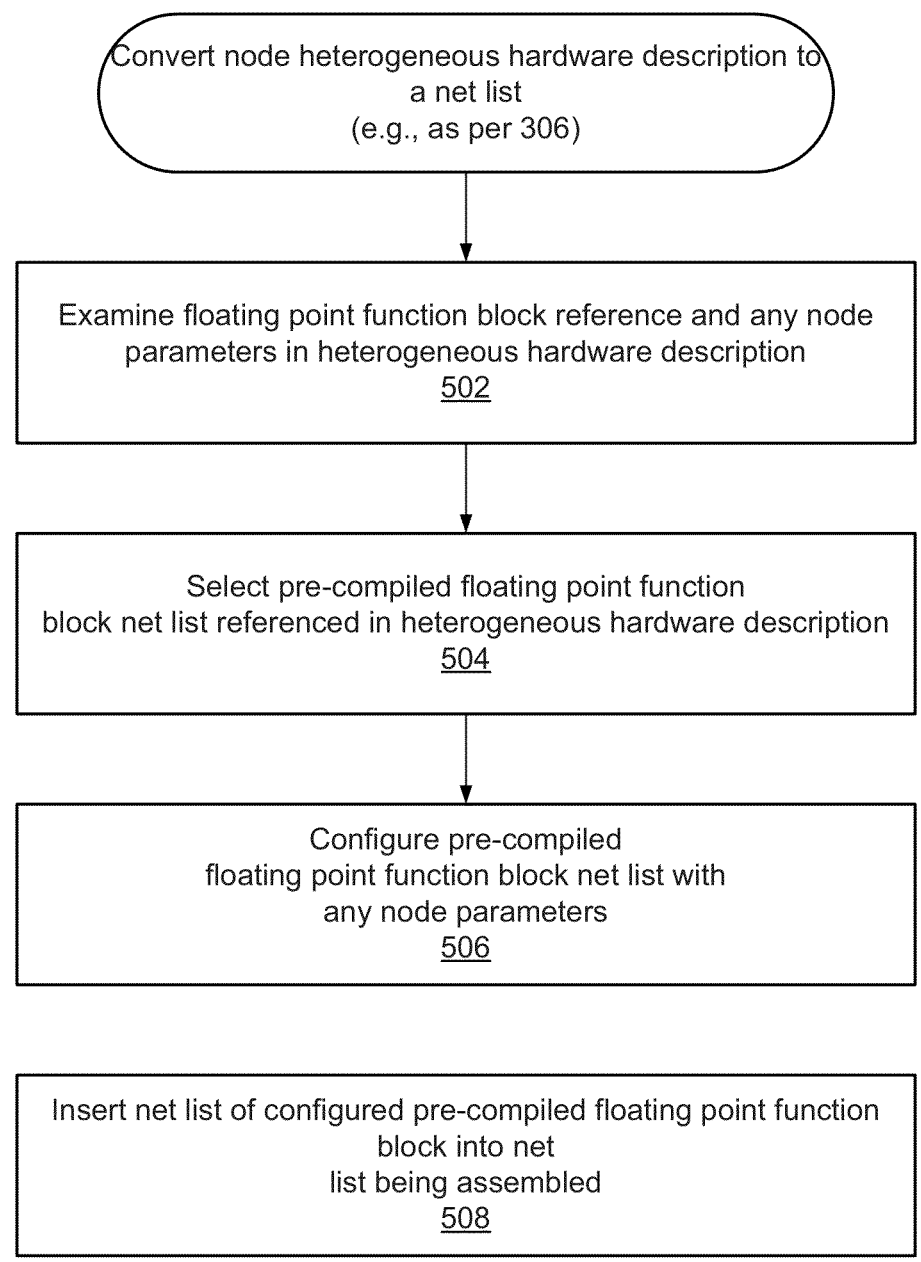
FIG. 14 illustrates converting a node heterogeneous hardware description to a net list, according to one embodiment.

FIG. 14—Converting a Node into a Hardware Description

FIG. 14 is a flowchart diagram of a portion of step 306 of FIGS. 6 and 7, illustrating operation where the method converts the hardware description for a node into a net list. FIG. 14 illustrates operation of converting a hardware description of a node, wherein the hardware description comprises a reference to a function block and may include node parameters. It is noted that where the hardware description of a node comprises a description of the actual registers, gates, etc. which perform the operation of the node, then conversion of this hardware description to a net list is readily performed using any of various types of synthesis tools. As with the above methods, while the embodiment described may be in terms of a graphical program, it should be noted that the graphical program implementation is exemplary only, and that the techniques of FIG. 14 are also applicable to text based (i.e., textual) programs and/or combinations of textual and graphical programs. For example, instead of "nodes", a text based program implementation may be directed to corresponding text based functions or programs.

As shown, in step 502 the method examines the function block reference and any node parameters present in the hardware description. In step 504, the method selects the referenced pre-compiled function block from the library 308, which essentially comprises a net list describing the function block. In step 506 the method then configures the pre-compiled function block net list with any parameters determined in step 502. In step 508 the method then inserts the configured pre-compiled function block into the net list which is being assembled.

Figure 15:
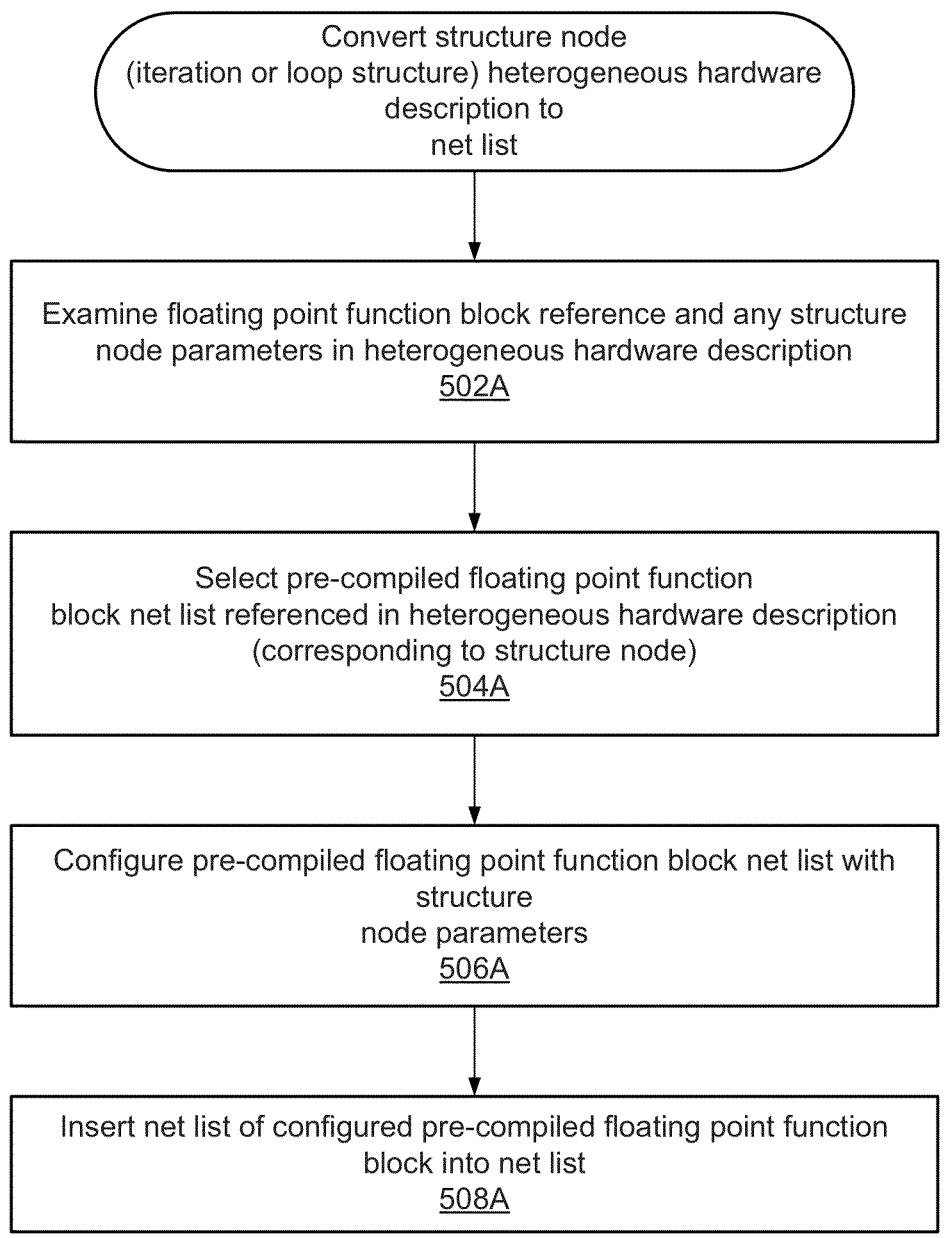
FIG. 15 illustrates converting a structure node hardware description to a net list, according to one embodiment.

FIG. 15—Converting a Structure Node into a Hardware Description

FIG. 15 is a flowchart diagram illustrating operation of the flowchart of FIG. 14, where the method converts the hardware description for a structure node into a net list. FIG. 15 illustrates operation of converting a hardware description of a structure node, wherein the hardware description comprises a reference to a structure node function block and includes structure node parameters. As with the above methods, while the embodiments described may be in terms of a graphical program, it should be noted that the graphical program implementation is exemplary only, and that the techniques of FIG. 13 are also applicable to text based (i.e., textual) programs and/or combinations of textual and graphical programs. For example, instead of a "structure node", a text based program implementation may be directed to corresponding text based software functions or structures.

As shown, in step 502A the method examines the function block reference and the structure node parameters present in the hardware description. The structure node parameters may include parameters such as the iteration number, loop condition, period, phase delay, etc. In step 504A the method selects the referenced pre-compiled function block from the library 308, which essentially is a net list describing the structure node function block. In step 506A the method then configures the pre-compiled function block net list with the structure node parameters determined in step 502A. This involves setting the period and phase delay of execution of the structure node as well as any other parameters such as iteration number, loop condition, etc. In step 508A the method then inserts the configured pre-compiled function block into the net list which is being assembled.

Figure 16:
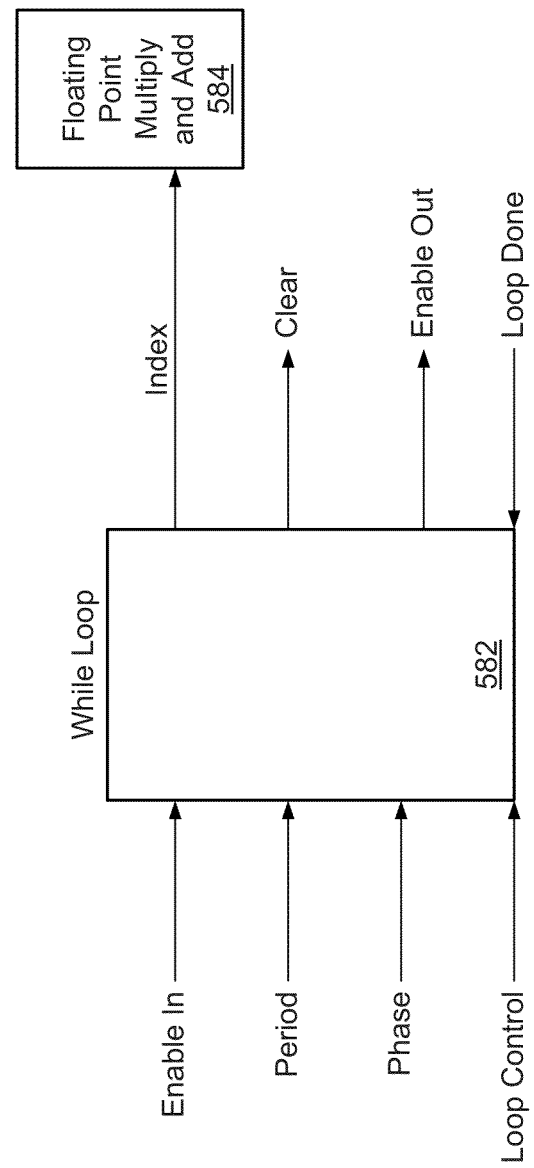
FIG. 16 illustrates the floating point function block for a structure node implemented in heterogeneous hardware components, according to one embodiment.

FIG. 16—Function Block for a Structure Node

FIG. 16 is a block diagram illustrating an exemplary While loop function block 582. As shown, the While loop function block includes enabling, period, and phase inputs, as well as a loop control input. The While loop function block provides an index output which is provided to a floating point multiply and add node 584. The adder operates to increment each time the index signals provided to monitor the number of times the While loop is executed. The While loop further outputs Clear and Enable Out signals to control the program within the While loop and further receives a Loop Done signal input which is used to indicate whether the loop has completed. In a textual program implementation, the above features apply to a corresponding text-based software construct, e.g., a textual While loop.

Figure 17:
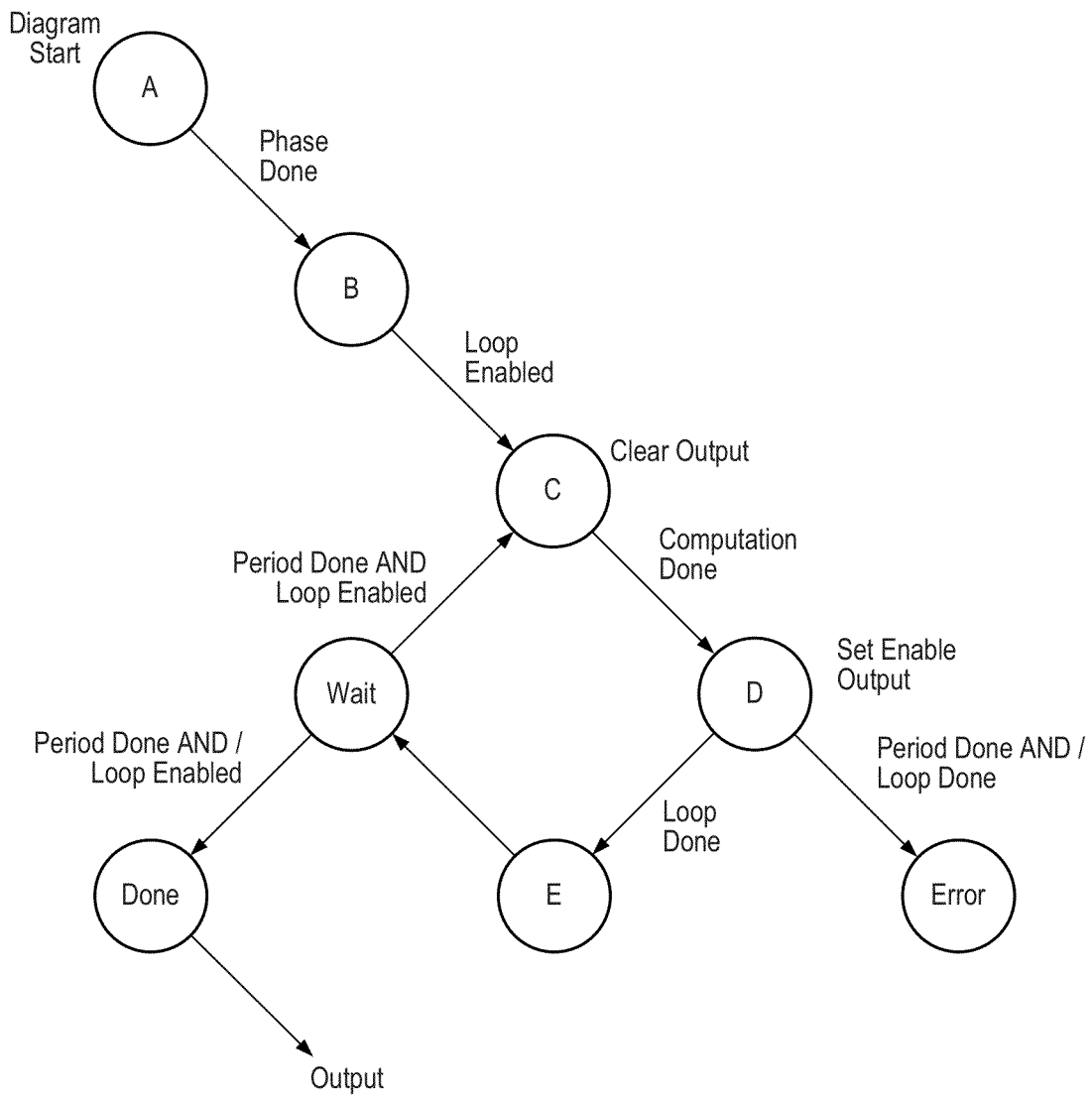
FIG. 17 is a state diagram illustrating operation of the structure node function block of FIG. 16, according to one embodiment.

FIG. 17—Operation of Structure Node Function Block

FIG. 17 is a state diagram illustrating operation of the while loop function block shown in FIG. 16. As shown, a diagram start operation precedes to state A. When Phase Done is true indicating that the phase has completed, then the state machine advances to state B. The state machine remains in state B until the Loop Enable signal is true, indicating that the loop has been enabled to begin execution. When the Loop Enable signal is asserted, the state machine advances from state B to state C. In state C the Clear Output signal is asserted, clearing the loop output prior to execution of the loop.

The state machine then advances from state C to state D. In state D the computation is performed, and the Set Enable out signal is asserted. If the period is done and the loop is not yet completed, signified by the equation:

Period Done and/Loop Done then the state machine proceeds to an error state and operation completes. Thus, the period set for execution for the loop was not sufficiently long to allow the loop to complete. In other words, the loop took more time to complete than the period set for execution of the loop.

The state machine advances from state D to state E when the Loop Done signal is asserted prior to the Period Done signal being asserted, indicating that the loop has completed prior to the period allotted for the loop execution being over.

The state machine then advances from state E to a wait state, as shown. If the period is done and the loop is not re-enabled, signified by the condition:

Period Done &/Loop Enabled then the state machine advances from the Wait to the Done state. If the period has completed and the loop is still enabled, indicating that another execution of the loop is necessary, then the state machine advances from the Wait state back to the C state. Thus, the state machine advances through state C, D, E, and Wait to perform looping operations. The above features are also applicable to textual program based equivalents, e.g., corresponding text based software constructs or functions.

Figure 18:
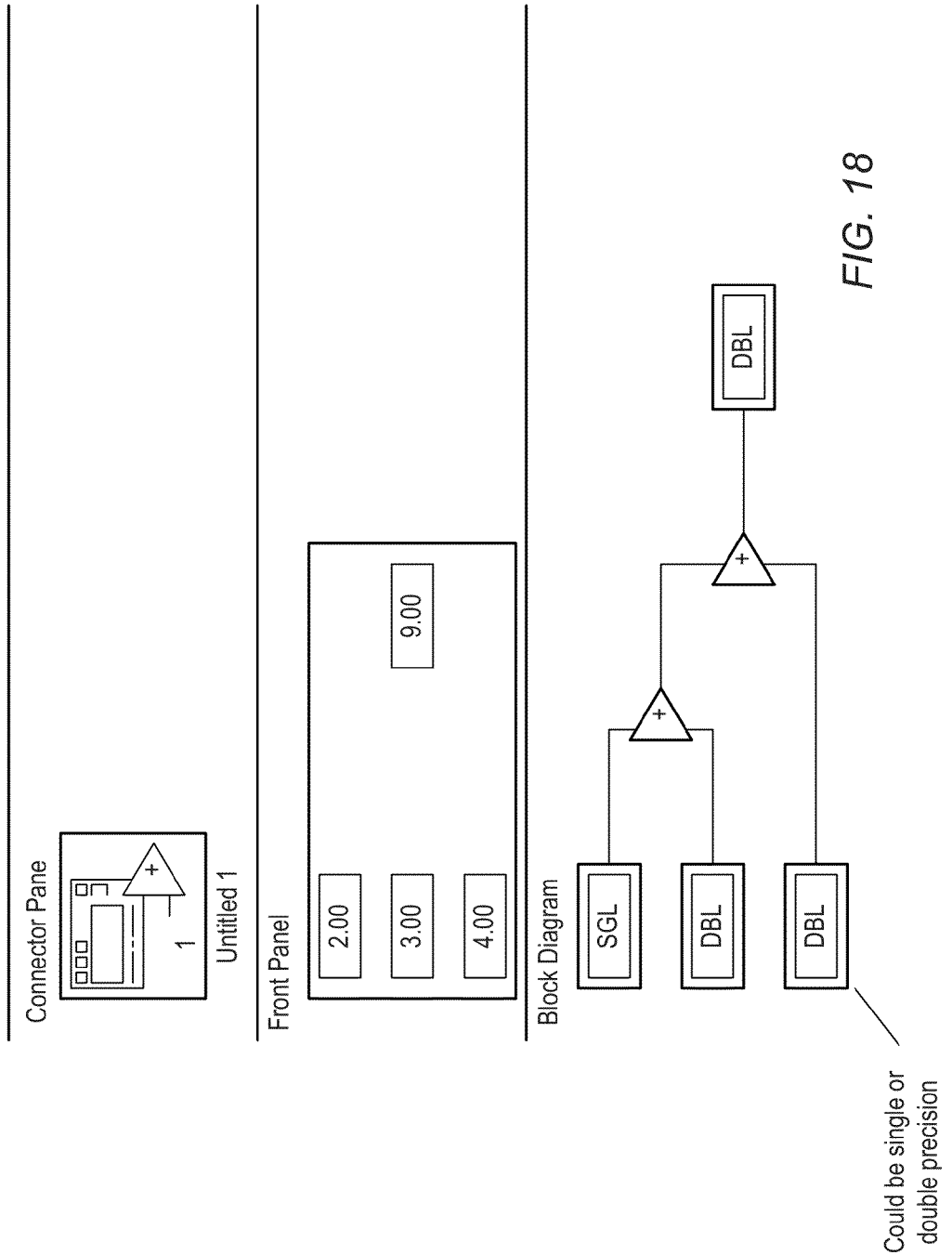
FIG. 18 illustrates an exemplary simple graphical program, according to one embodiment.

FIG. 18—Simple Graphical Program Example

FIG. 18 illustrates a simple example of a graphical program. In FIG. 18 the graphical program includes three input terminals, specifically, a single precision input, a first double precision input, and a second double precision input, which could be a single precision input if desired, and one double precision output terminal. As may be seen, the graphical program simply comprises a first 2-input Add function node which receives input from the first two inputs terminals, and a second 2-input Add function node which receives the output from the first Add function node and receives an output from the third input terminal. The second 2-input Add function node provides an output to the double precision output terminal as shown.

Figure 19:
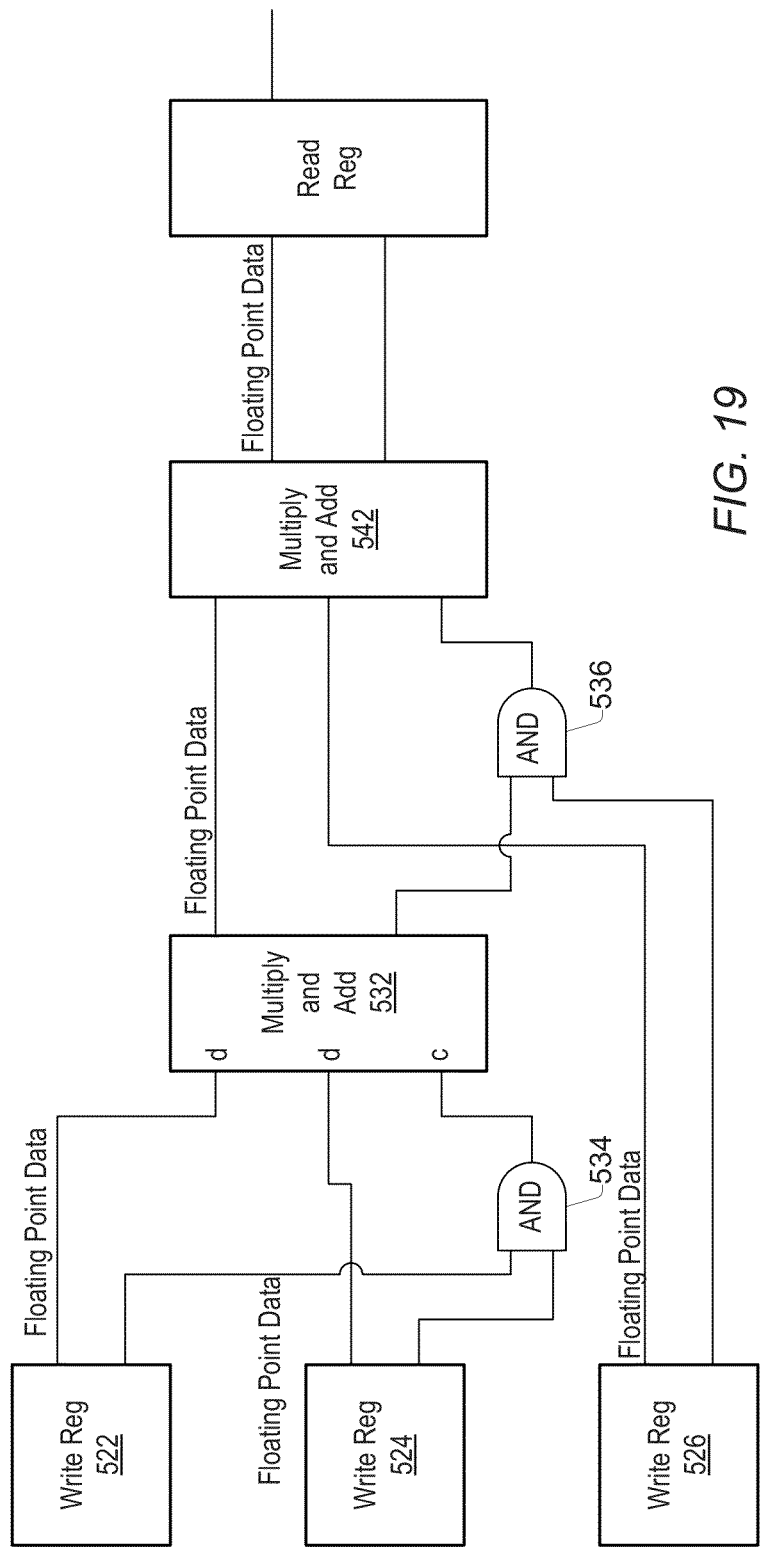
FIG. 19 is a conceptual diagram of the heterogeneous hardware description of the graphical program of FIG. 18 and communication mechanisms between heterogeneous hardware components, according to one embodiment.

FIG. 19—Hardware Result

FIG. 19 is a conceptual diagram of the resulting hardware after the graphical program example of FIG. 18 is converted into a hardware description. As shown, the hardware diagram includes three write registers 522-526 corresponding to each of the three input terminals. The data outputs of the first two write registers 522 and 524 are provided as inputs to a first two-input floating point multiply and add node 532, which corresponds to the first floating point multiply and add node in the block diagram of FIG. 18. The hardware description also involves creating an AND gate 534 which receives control outputs from each of the first two write registers 522 and 524 and provides a single output to the control input of the floating point multiply and add node 532. The purpose of the AND gate 534 is to prevent the floating point multiply and add node 532 from executing until both inputs have been received.

The Adder 532 provides a data output to a second two-input floating point multiply and add node 542, which corresponds to the second floating point multiply and add node in the block diagram of FIG. 18. The first floating point multiply and add node 532 also generates an enable out signal which is provided to an input of a second AND gate 536. The other input of the AND gate 536 receives an output from the third write register 526, corresponding to the third input terminal. The AND gate 536 provides an output to a control input of the second floating point multiply and add node 542. Thus, the AND gate 536 operates to ensure that the second floating point multiply and add node 542 does not execute until all inputs have been received by the floating point multiply and add node 542. The second floating point multiply and add node 542 provides a data output to a read register 546 associated with the output terminal. The second floating point multiply and add node 542 also provides an enable out signal to the read register 546, which notifies the read register 546 when valid data has been provided.

Thus, as shown, to create a hardware description for each of the input terminals, the flowchart diagram of FIG. 9 is executed, which operates to create a hardware description of a write register 522, 524, and 526, each with data and control outputs. For each floating point multiply and add function node, the flowchart diagram of FIG. 10 is executed, which operates to create a hardware description of an adder 532 or 542, and further creates an associated N input AND gate 534 or 536, with inputs connected to the dependent inputs of the adder function node to ensure execution at the proper time. Finally, the flowchart diagram of FIG. 11 is executed for the output terminal of the graphical program, which operates to generate a hardware description of a read register with data and control inputs. As noted above, textual program equivalents are also contemplated. In other words, the techniques disclosed above are directly applicable to corresponding textual programs targeted for deployment on programmable hardware.

Figure 20:
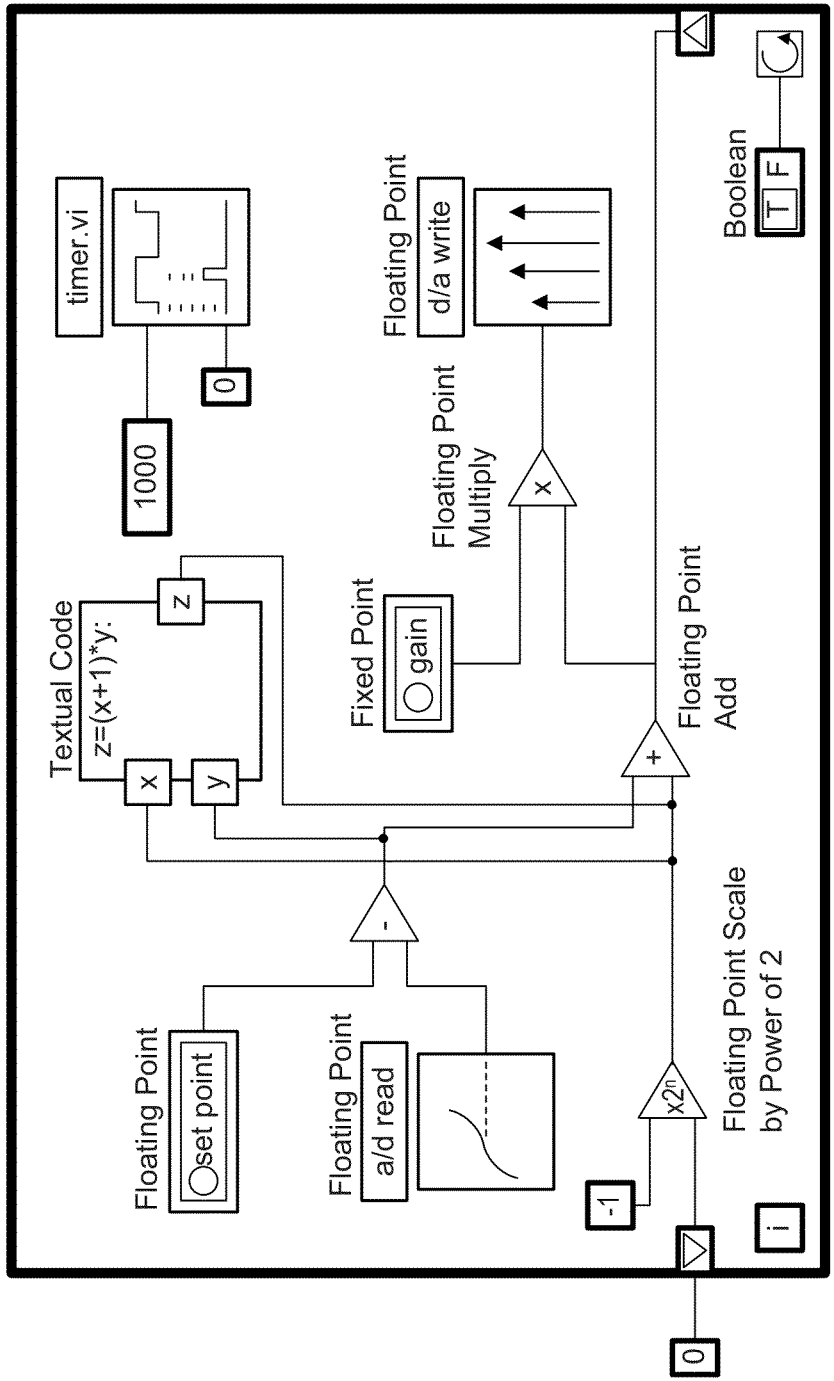
FIG. 20 illustrates another exemplary graphical program, according to one embodiment.
Figure 21:
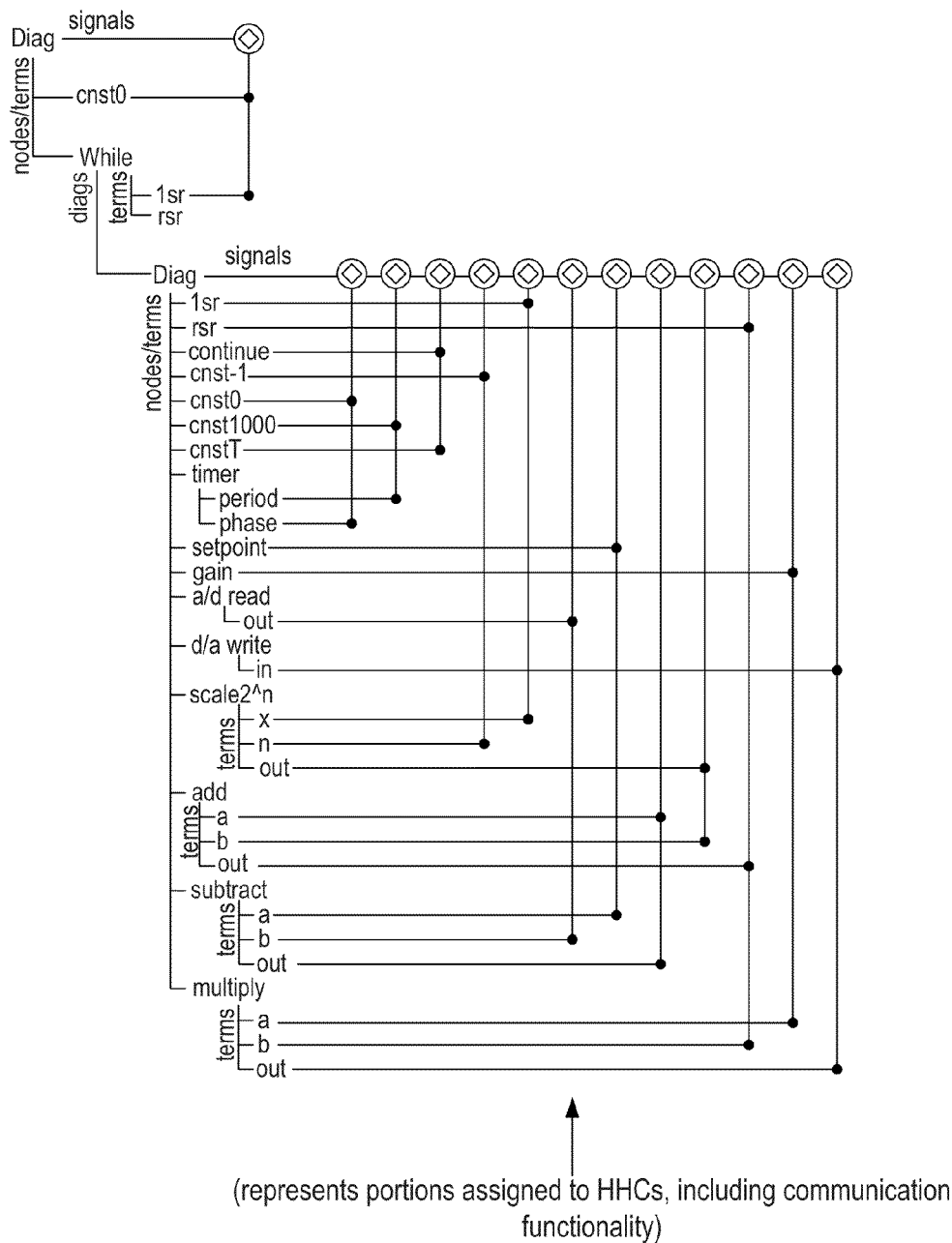
FIG. 21 illustrates a tree of floating point data structures created in response to the graphical program of FIG. 20, and is a conceptual diagram of the heterogeneous hardware description of the graphical program of FIG. 20, according to one embodiment.
Figure 22:
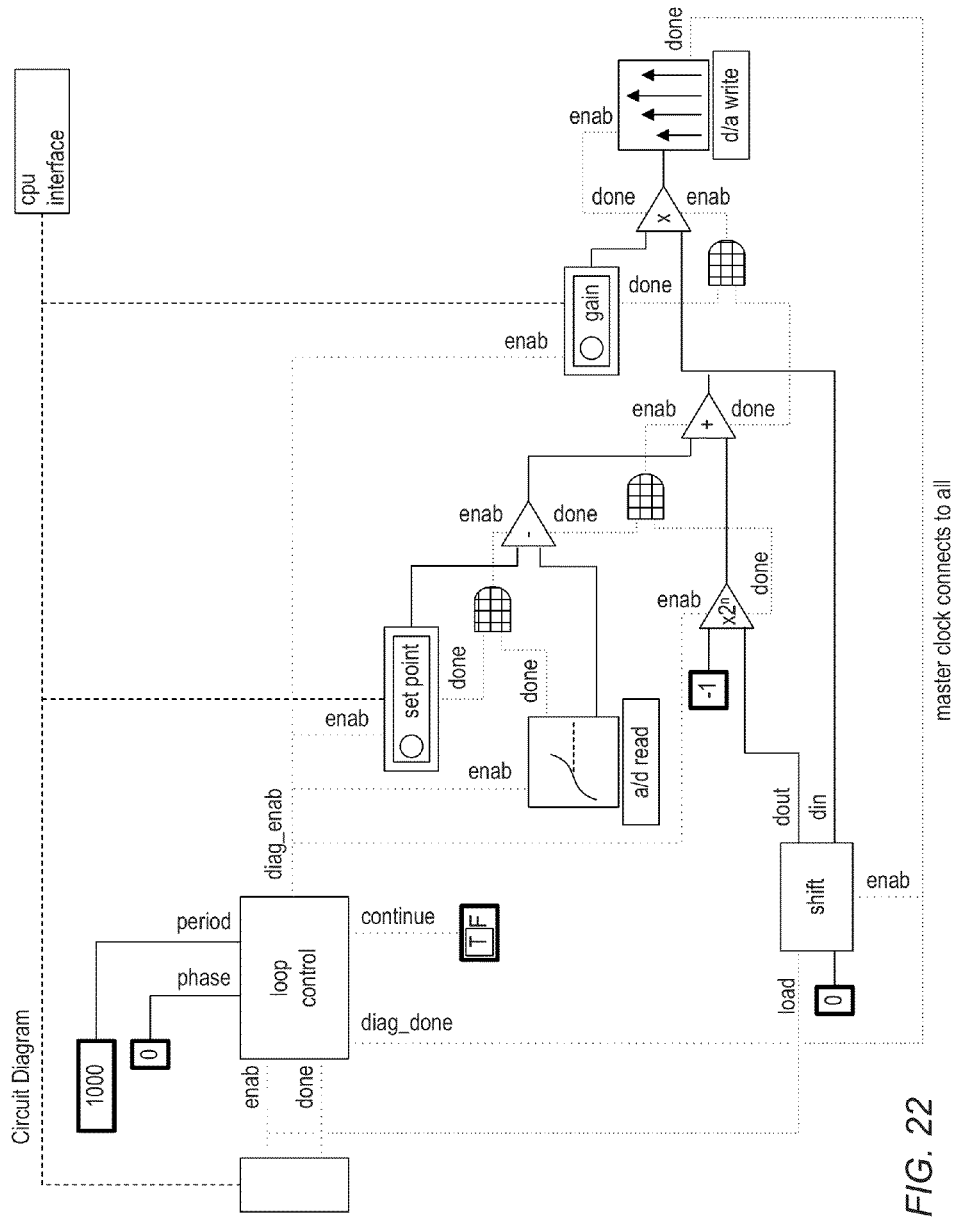
FIG. 22 is a circuit diagram of the heterogeneous hardware implementation of the mixed floating- and fixed-point graphical program of FIG. 20.

FIGS. 20-22: Example of Converting a Graphical Program into a Hardware Implementation FIGS. 20-22 comprise a more detailed example illustrating operation of the present invention, according to one embodiment. As with the above methods, while the embodiments described may be in terms of a graphical program, it should be noted that the graphical program implementation is exemplary only, and that the techniques of FIGS. 20-22 are also applicable to text based (i.e., textual) programs and/or combinations of textual and graphical programs. For example, instead of a graphical program with a graphical While loop, a text based program implementing a While loop with contained textual functions may be converted to a hardware implementation.

FIG. 20 illustrates an example graphical program (a LabVIEW diagram) which is converted into a hardware implementation, e.g., an FPGA implementation, using an embodiment of the present invention. As shown, the graphical program comprises a plurality of interconnected nodes comprised in a While loop. As shown, the While loop includes shift register icons, represented by the down and up arrows at the left and right edges, respectively, of the While loop. A 0 constant positioned outside of the While loop is connected to the down arrow of the shift register at the left edge of the While loop.

As FIG. 20 shows, inside the While loop, a floating point set point element and a floating point a/d (analog to digital) read node provide respective inputs to a floating point subtract node (triangular node with minus sign), which computes the difference between the input values and provides the difference as output. Below the floating point a/d read, a floating point "scale by power of 2" node (scaling node) receives inputs from a constant (−1) and a while loop left shift register, and outputs a scaled value, as shown. The outputs of the floating point subtract node and the scaling node are provided as x and y inputs to a textual code block, which computes an output $z=(x+1)*y$. a floating point add node (triangular node with plus sign) receives this output (z) and the output of the floating point subtract node as inputs and outputs the sum. A floating point multiply node (triangular node with "X") receives respective inputs from a fixed point gain constant and the floating point add node and provides the resulting product to a floating point d/a write node.

As shown, the While loop also includes a timer icon representing or signifying timing for the While loop. The timer icon includes inputs for period and phase. As shown, the timer icon receives a constant of 1000 for the period and receives a constant of 0 for the phase. In an alternate embodiment, the While loop includes input terminals which are configured to receive timing information, such as period and phase.

FIG. 21 illustrates the LabVIEW data structures created in response to or representing the diagram or graphical program of FIG. 20. The data structure diagram of FIG. 20 comprises a hierarchy of data structures corresponding to the diagram of FIG. 20, and represents portions assigned (automatically) to respective heterogeneous hardware components, including at least one programmable communication element (which includes timing functionality). As shown, the LabVIEW data structure representation includes a top level diagram which includes a single signal connecting the 0 constant to the left hand shift register of the While loop. Thus the top level diagram includes only the constant (0) and the While loop.

The While loop includes a sub-diagram which further includes left and right shift register terms, the continue flag of the While loop, a plurality of constants, a timer including period and phase inputs, global variables setpoint and gain, sub-VIs a/d read and d/a write, and various function icons, e.g., scale, add, subtract, and multiply. Further, each of the objects in the diagram have terminals, and signals connect between these terminals.

FIG. 22 illustrates a circuit diagram representing the hardware description which is created in response to the data structures of FIG. 21. The circuit diagram of FIG. 22 implements the graphical program of FIG. 20. As shown, the CPU interface signals are bussed to the global variables. Although not shown in FIG. 22, the CPU interface signals are also provided to the sub-VIs a/d read and d/a write.

The While loop is essentially abstracted to a control circuit which receives the period and phase, and includes an external enable directing the top level diagram to execute, which starts the loop. The loop then provides a diagram enable(diag_enab) signal to start the loop and waits for a diagram done (diag_done) signal to signify completion of the loop, or the period to expire. Based on the value of the Continue flag, the loop provides a subsequent diag_enab signal or determines that the loop has finished and provides a Done signal to the top level diagram. Although not shown in FIG. 22, the loop control block also provides a diagram clear enable out (diag_clear_enab_out) signal to every node in the sub-diagram of the While loop. Thus the loop control block outputs a diagram enable (diag_enab) signal that is fed to all of the starting nodes in the diagram within the While loop. The Done signals from these items are fed into an AND gate, whose output is provided to enable subsequent nodes.

The shift register includes a data in, a data out and an enable input which clocks the data in (din) to the data out (dout), and a load which clocks the initial value into the shift register.

The following is an exemplary VHDL description corresponding to the example of FIGS. 20-22:

```
library ieee;
use ieee.std_logic_1164.all;
entity example0 is
    port (
        clk : in std_logic;
        enable_in : in std_logic;
        clr_enable_out : in std_logic;
        da_clk : in std_logic;
        cpu_clk : in std_logic;
        cpu_reset : in std_logic;
        cpu_iord : in std_logic;
        cpu_iowt : in std_logic;
        cpu_devsel : in std_logic;
        cpu_ioaddr : in std_logic_vector(31 downto 0);
        cpu_iodata : in std_logic_vector(31 downto 0);
        ad_clk : in std_logic;
        enable_out : out std_logic
    );
end example0;
architecture Structural of example0 is
    signal sCLK : std_logic;
    signal sda_clk : std_logic;
    signal scpu_clk : std_logic;
    signal scpu_reset : std_logic;
    signal scpu_iord : std_logic;
    signal scpu_iowt : std_logic;
    signal scpu_devsel : std_logic;
    signal scpu_ioaddr : std_logic_vector(31 downto 0);
    signal scpu_iodata : std_logic_vector(31 downto 0);
    signal sad_clk : std_logic;
    signal s1AC : std_logic_vector(15 downto 0);
    signal s115 : std_logic; -- node 114 enable_out
    constant cE8C : std_logic_vector(15 downto 0) :=
"0000000000000000"; -- 0
    signal s114 : std_logic; -- diagram done
    signal s116 : std_logic; -- diagram clr_enable_out
    signal s278D : std_logic; -- node 278C enable_out
    signal s145 : std_logic; -- node 144 enable_out
    component shift 16
        port (
            clk : in std_logic;
            enable_in, load : in std_logic;
            initval : in std_logic_vector(15 downto 0);
            din : in std_logic_vector(15 downto 0);
            dout : out std_logic_vector(15 downto 0)
        );
    end component;
    signal s1310 : std_logic_vector(15 downto 0);
    signal s209C : std_logic_vector(15 downto 0);
    signal s1344 : std_logic_vector(15 downto 0);
    signal s1628 : std_logic_vector(15 downto 0);
    signal s1270 : std_logic_vector(15 downto 0);
    signal s1684 : std_logic_vector(15 downto 0);
    signal s19CC : std_logic_vector(15 downto 0);
    signal s1504 : std_logic_vector(15 downto 0);
    signal s149C : std_logic_vector(15 downto 0);
    signal sC44 : std_logic_vector(31 downto 0);
    signal s974 : std_logic_vector(31 downto 0);
    signal s4D8 : std_logic;
    signal s2A1 : std_logic; -- node 2A0 enable_out
    constant c470 : std_logic := '1';
    constant c948 : std_logic_vector(31 downto 0) :=
"00000000000000000000001111101000"; -- 1000
    constant cC04 : std_logic_vector(31 downto 0) :=
"00000000000000000000000000000000"; -- 0
    constant c1960 : std_logic_vector(15 downto 0) :=
"1111111111111111"; -- -1
    signal s2A0 : std_logic; -- diagram done
    signal s2A2 : std_logic; -- diagram clr_enable_out
    component write_reg
        port (
            clk : in std_logic;
            enable_in : in std_logic;
            clr_enable_out : in std_logic;
            cpu_clk : in std_logic;
            cpu_reset : in std_logic;
            cpu_iord : in std_logic;
            cpu_iowt : in std_logic;
            cpu_devsel : in std_logic;
            cpu_ioaddr : in std_logic_vector(31 downto 0);
            cpu_iodata : in std_logic_vector(31 downto 0);
            decodeaddr : in std_logic_vector(3 downto 0);
            data : out std_logic_vector(15 downto 0);
            enable_out : out std_logic
        );
    end component;
    signal s5BA : std_logic_vector(3 downto 0);
    constant c5B8 : std_logic_vector(3 downto 0) := "00";
    signal s1A7E : std_logic_vector(3 downto 0);
    constant c1A7C : std_logic_vector(3 downto 0) := "10";
    signal s641 : std_logic; -- node 640 enable_out
    signal s39D : std_logic; -- node 39C enable_out
    component a_d_read
        port (
            clk : in std_logic;
            enable_in, clr_enable_out : in std_logic;
            ai_read_val : out std_logic_vector(15 downto 0);
            ad_clk : in std_logic;
            enable_out : out std_logic
        );
    end component;
    signal s13A1 : std_logic; -- node 13A0 enable_out
    component prim_Scale_By_Power_Of_2_16
        port (
            clk : in std_logic;
            enable_in, clr_enable_out : in std_logic;
            x_2_n : out std_logic_vector(15 downto 0);
            x : in std_logic_vector(15 downto 0);
            n : in std_logic_vector(15 downto 0);
            enable_out : out std_logic
        );
    end component;
    signal s10E9 : std_logic; -- node 10E8 enable_out
    component prim_Subtract_16
        port (
            clk : in std_logic;
            enable_in, clr_enable_out : in std_logic;
            x_y : out std_logic_vector(15 downto 0);
            y : in std_logic_vector(15 downto 0);
            x : in std_logic_vector(15 downto 0);
            enable_out : out std_logic
        );
```

```
        end component;
    signal s14D1 : std_logic; -- node 14D0 enable_out
    component prim_Add_16
        port (
            clk : in std_logic;
            enable_in, clr_enable_out : in std_logic;
            x_y : out std_logic_vector(15 downto 0);
            y : in std_logic_vector(15 downto 0);
            x : in std_logic_vector(15 downto 0);
            enable_out : out std_logic
        );
    end component;
    signal s1A01 : std_logic; -- node 1A00 enable_out
    component prim_Multiply_16
        port (
            clk : in std_logic;
            enable_in, clr_enable_out : in std_logic;
            x_y : out std_logic_vector(15 downto 0);
            y : in std_logic_vector(15 downto 0);
            x : in std_logic_vector(15 downto 0);
            enable_out : out std_logic
        );
    end component;
    signal s1725 : std_logic; -- node 1724 enable_out
    component d_a_write
        port (
            clk : in std_logic;
            enable_in, clr_enable_out : in std_logic;
            a0_write_val : in std_logic_vector(15 downto 0);
            da_clk : in std_logic;
            enable_out : out std_logic
        );
    end component;
    component whileloop_timed
        port (
            clk : in std_logic;
            enable_in, clr_enable_out : in std_logic;
            diag_enable, diag_clr_enable_out : out std_logic;
            diag_done : in std_logic;
            period : in std_logic_vector(15 downto 0);
            phase : in std_logic_vector(15 downto 0);
            continue : in std_logic;
            enable_out : out std_logic
        );
    end component;
begin
    s114 <= s278D AND s145;
    s1AC <= cE8C;
    nDF8: shift16
        port map(
            clk => sCLK,
            load => s115,
            enable_in => s2A0,
            initval => s1AC,
            din => s1344,
            dout => s19CC
        );
    s2A0 <= s1725;
    s4D8 <= c470;
    s974 <= c948;
    sC44 <= cC04;
    s1684 <= c1960;
    -- setpoint
    n5B8: write_reg
        port map(
            clk => sCLK,
            enable_in => s2A1,
            clr_enable_out => s2A2,
            enable_out => s5B9,
            cpu_clk => scpu_clk,
            cpu_reset => scpu_reset,
            cpu_iord => scpu_iord,
            cpu_iowt => scpu_iowt,
            cpu_devsel => scpu_devsel,
            cpu_ioaddr => scpu_ioaddr,
            cpu_iodata => scpu_iodata,
            decodeaddr => s5BA,
            data => s149C
        );
    s5BA <= c5B8;
    -- gain
    n1A7C: write_reg
        port map(
            clk => sCLK,
            enable_in => s2A1,
            clr_enable_out => s2A2,
            enable_out => s1A7D,
            cpu_clk => scpu_clk,
            cpu_reset => scpu_reset,
            cpu_iord => scpu_iord,
            cpu_iowt => scpu_iowt,
            cpu_devsel => scpu_devsel,
            cpu_ioaddr => scpu_ioaddr,
            cpu_iodata => scpu_iodata,
            decodeaddr => s1A7E,
            data => s1628
        );
    s1A7E <= c1A7C;
    n39C: a_d_read
        port map(
            clk => sCLK,
            enable_in => s2A1,
            clr_enable_out => s2A2,
            ai_read_val => s1504,
            ad_clk => sad_clk,
            enable_out => s39D
        );
    n13A0: prim_Scale_By_Power_Of_2_16
        port map(
            clk => sCLK,
            enable_in => s2A1,
            clr_enable_out => s2A2,
            x_2_n => s1270,
            x => s19CC,
            n => s1684,
            enable_out => s13A1
        );
    s10E8 <= s39D AND s5B9;
    n10E8: prim_Subtract_16
        port map(
            clk => sCLK,
            enable_in => s10E8,
            clr_enable_out => s2A2,
            x_y => s1310,
            y => s1504,
            x => s149C,
            enable_out => s10E9
        );
    s14D0 <= s13A1 AND s10E9;
    n14D0: prim_Add_16
        port map(
            clk => sCLK,
            enable_in => s14D0,
            clr_enable_out => s2A2,
            x_y => s1344,
            y => s1270,
            x => s1310,
            enable_out => s14D1
        );
    s1A00 <= s14D1 AND s1A7D;
    n1A00: prim_Multiply_16
        port map(
            clk => sCLK,
            enable_in => s1A00,
            clr_enable_out => s2A2,
            x_y => s209C,
            y => s1344,
            x => s1628,
            enable_out => s1A01
        );
    n1724: d_a_write
        port map(
            clk => sCLK,
            enable_in => s1A01,
            clr_enable_out => s2A2,
            a0_write_val => s209C,
```

```
                    da_clk => sda_clk,
                    enable_out => s1725
                );
            n144: whileloop_timed
                port map(
                    clk => sCLK,
                    enable_in => s115,
                    enable_out => s116,
                    period => sC44,
                    phase => s974,
                    diag_enable => s2A1,
                    diag_clr_enable_out => s2A2,
                    diag_done => s2A0,
                    continue => s4D8,
                    enable_out => s145
                );
            sCLK <= clk;
            s115 <= enable_in;
            s116 <= clr_enable_out;
            s114 <= enable_out;
            sda_clk <= da_clk;
            scpu_clk <= cpu_clk;
            scpu_reset <= cpu_reset;
            scpu_iord <= cpu_iord;
            scpu_iowt <= cpu_iowt;
            scpu_devsel <= cpu_devsel;
            scpu_ioaddr <= cpu_ioaddr;
            scpu_iodata <= cpu_iodata;
            sad_clk <= ad_clk;
        end Structural;
```

Component Library

One embodiment of the present invention includes a component library that is used to aid in converting various primitives or nodes in a graphical program into a hardware description, such as a VHDL source file. The following provides two examples of VHDL components in this component library, these being components for a While loop and a multiplier primitive.

1. While Loop Component

The following comprises a VHDL component referred to as whileloop.vhd that the present invention uses when a While loop appears on a graphical program or diagram. Whileloop.vhd shows how a While loop in a graphical program is mapped to a state machine in hardware. It is noted that other control structures such as a "For loop" are similar. Whileloop.vhd is as follows:

```
library ieee;
use ieee.std_logic_1164.all;
entity whileloop is
    port(
        clk,
        enable in,              -- start loop execution
        clr_enable_out          -- reset loop execution
                     : in std_logic;
        diag_enable,            -- start contained diagram execution
        diag_clr_enable_out     -- reset contained diagram execution
                     : out std_logic;
        diag_done,              -- contained diagram finished
        continue                -- iteration enabled
                     : in std_logic;
        enable_out              -- looping complete
                     : out std_logic
    );
end whileloop;
architecture rtl of whileloop is
    type state_t is (idle_st, -- reset state
                     test_st, -- check for loop
                              completion
                     calc_st, -- enable diagram
                              execution
                     end_st -- assert enable_out
                    );
    signal nstate,state : state_t;
begin
    process(state,enable_in,clr_enable_out,diag_done,continue)
    begin
        diag_clr_enable_out <= '0';
        diag_enable <= '0';
        enable_out <= '0';
        case state is
            when idle_st =>
                diag_clr_enable_out <= '1';
                if enable_in='1' then
                    nstate <= test_st;
                else
                    nstate <= idle_st;
                end if;
            when test_st =>
                diag_clr_enable_out <= '1';
                if continue='1' then
                    nstate <= calc_st;
                else
                    nstate <= end_st;
                end if;
            when calc_st =>
                diag_enable <= '1';
                if diag_done='1' then
                    nstate <= test_st;
                else
                    nstate <= calc_st;
                end if;
            when end_st =>
                enable_out <= '1';
                nstate <= end_st;
        end case;
        -- Because it appears at the end of the process, this test
        -- overrides any previous assignments to nstate
        if clr_enable_out='1' then
            nstate <= idle_st;
        end if;
    end process;
    process(clk)
    begin
        if clk'event and clk='1' then
            state <= nstate;
        end if;
    end process;
end rtl;
```

2. Multiplier Primitive Component

The following comprises a VHDL component referred to as prim_multiply_16.vhd that the present invention uses when a multiplier primitive appears on a graphical program or diagram. By following the path from enable_in to enable_out, it can be seen how the self-timed logic works—each component asserts enable_out when the data output is valid. Other primitives like "add" or "less than" operate in a similar manner. Prim_multiply_16.vhd is as follows:

```
library ieee;
use ieee.std_logic_1164.all;
entity prim_multiply_16 is
    port(
        clk : in std_logic;
        enable_in : in std_logic;
        clr_enable_out : in std_logic;
        x_y : out std_logic_vector(15 downto 0);
        x : in std_logic_vector(15 downto 0);
        y : in std_logic_vector(15 downto 0);
        enable_out : out std_logic
    );
end prim_multiply_16;
architecture altera of prim_multiply_16 is
COMPONENT lpm_mult
    GENERIC (LPM_WIDTHA: POSITIVE;
             LPM_WIDTHB: POSITIVE;
             LPM_WIDTHS: POSITIVE;
```

```
        LPM_WIDTHP: POSITIVE;
        LPM_REPRESENTATION: STRING := "UNSIGNED";
        LPM_PIPELINE: INTEGER := 0;
        LPM_TYPE: STRING := "L_MULT"
    );
    PORT (dataa: IN STD_LOGIC_VECTOR(LPM_WIDTHA-1
DOWNTO 0);
        datab: IN STD_LOGIC_VECTOR(LPM_WIDTHB-1
DOWNTO 0);
        aclr: IN STD_LOGIC := '0';
        clock: IN STD_LOGIC := '0';
        sum: IN STD_LOGIC_VECTOR(LPM_WIDTHS-1
DOWNTO 0) := (OTHERS => '0');
        result: OUT STD_LOGIC_VECTOR(LPM_WIDTHP-1
DOWNTO 0));
END COMPONENT;
    signal l_x,l_y : std_logic_vector(15 downto 0);
    signal l_xy : std_logic_vector(31 downto 0);
    signal l_enable_in : std_logic;
begin
    -- synchronize the incoming and outgoing data to guarantee
    -- a registered path on data through the multiplier
    -- register enable_out so it won't assert before data is
    -- available.
    process(clk)
    begin
        if clk'event and clk='1' then
            if clr_enable_out='1' then
                enable_out <= '0';
                l_enable_in <= '0';
            else
                enable_out <= l_enable_in;
                l_enable_in <= enable_in;
            end if;
            l_x <= x;
            l_y <= y;
            x_y <= l_xy(15 downto 0);
        end if;
    end process;
    gainx: lpm_mult
            GENERIC map(
                LPM_WIDTHA => 16,
                LPM_WIDTHB => 16,
                LPM_WIDTHS => 1,
                LPM_WIDTHP => 32,
                LPM_REPRESENTATION => "UNSIGNED",
                LPM_PIPELINE => 0
            )
            PORT map(
                dataa => l_x,
                datab => l_y,
                result => l_xy
            );
end altera;
```

Figure 23:
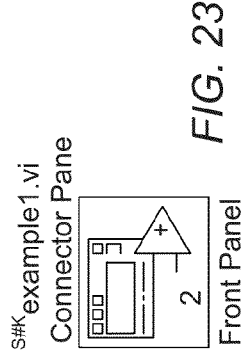
FIGS. 23-25 are graphical source code listings of an exemplary graphical program, according to one embodiment.
Figure 24:
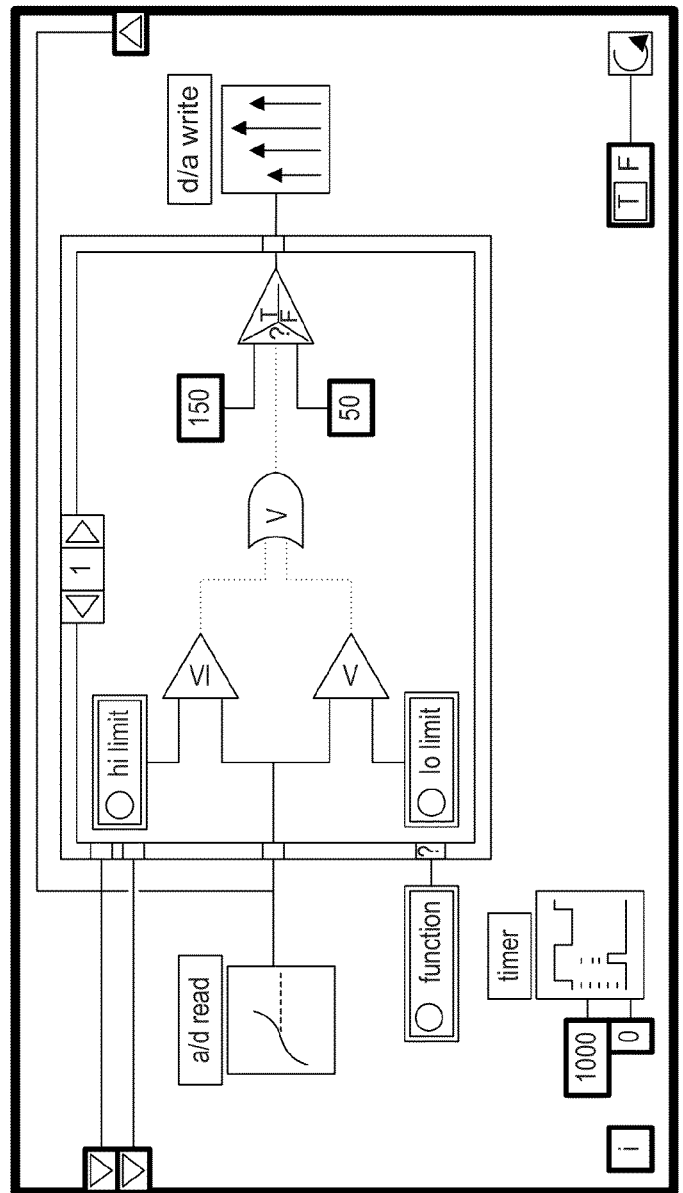
Figure 25:
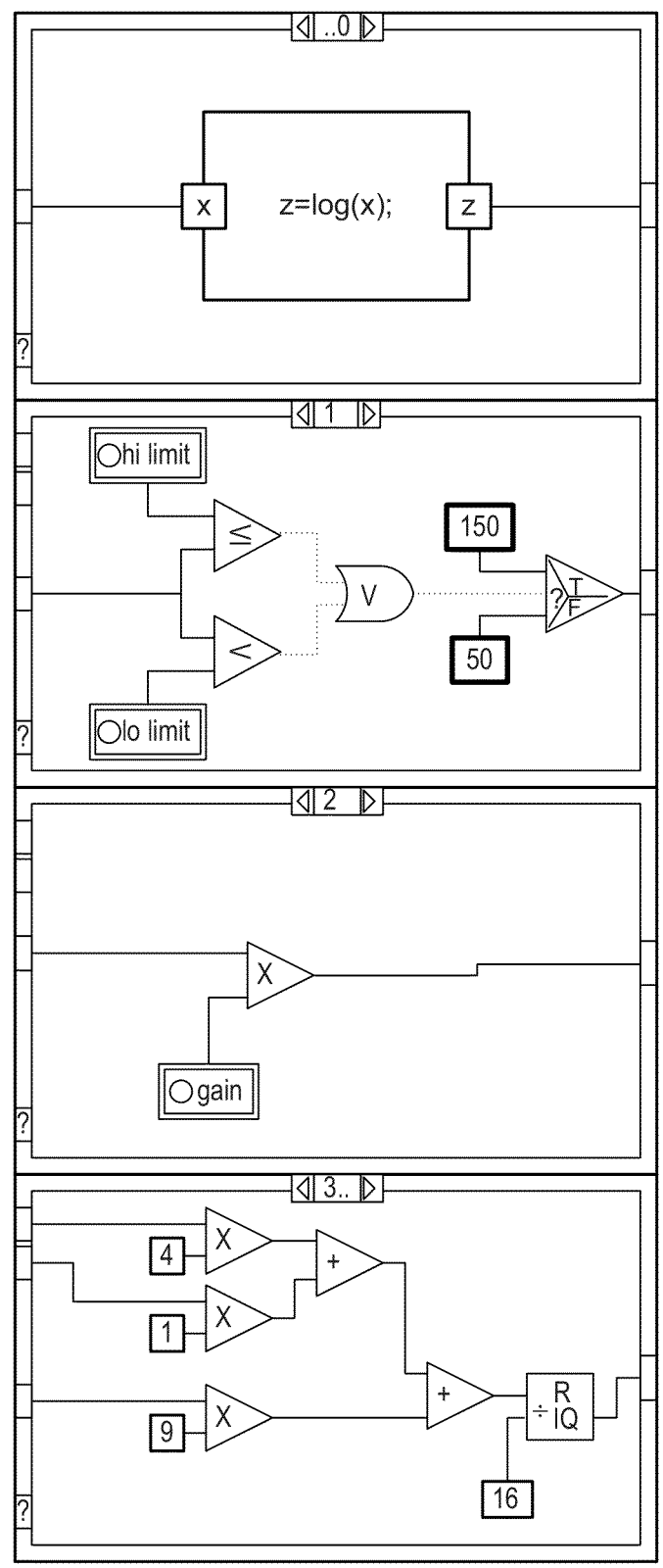

FIGS. 23-25—Exemplary Graphical Source Code

FIGS. 23-25 illustrate exemplary graphical source code listings of a graphical program, according to one embodiment. It should be noted that the graphical program source code shown is exemplary only, and is not intended to limit the graphical programs contemplated to any particular form, function, or appearance.

Acceleration of Simulations and Other Computationally Intensive Tasks:

The present techniques are broadly applicable to the field of textual or graphical data flow programming of heterogeneous hardware components (HHC) using floating-point constructs for real-time, faster-than-real-time and slower-than-real-time simulation, digital signal processing, algorithms, mathematics, optimization, artificial intelligence, search and other compute intensive tasks, including applications in the field of system simulation, e.g., multi-physics simulation of a system such as a circuit, electric power grid, motor, generator, power inverter, power converter, electromagnetics, communication network, system of actors, or other complex physical system, including computationally irreducible systems along with embedded software code and sets of configuration parameters associated with the system simulation, e.g., control software, analysis software or digital signal processing software.

As discussed above in detail, the parallel, floating-point program or graphical program, e.g., graphical data flow program or diagram, may be automatically assigned to configure a heterogenous hardware element or systems of heterogeneous hardware elements including internal and external communication and timing constraints for these purposes. In other words, the simulation may be represented using graphical programming, textual programming, or a combination of graphical, textual and other representations. The configured programmable hardware element may implement a hardware implementation of the program, including floating-point math functionality. The present techniques may also include graphical data transfer and synchronization mechanisms that enable a plurality of targets executing graphical floating-point math to simulate complex physical systems in which measurements, state-values, inputs, outputs and parameters may be shared between targets and represented using graphical floating-point programming constructs such as nodes, functions and wires. In some embodiments, the simulation mathematics may be represented graphically in a plurality of formats and structures including, but not limited to, state-space, nodal analysis, differential equations, algebraic equations, differential algebraic equations, state-charts, look up tables, descriptive CAD drawings or visual system representations, or finite element analysis. Multiple instances of the simulation mathematics may be executed concurrently, i.e., in parallel, on HHCs with populations of identical or varying configuration parameters, states, or simulation mathematics.

In some embodiments, while the real-time or faster-than-real-time simulation is executing on the HHCs, feedback may be incorporated in an open loop or closed loop manner based, for example, on data from physical measurements such as phasor-measurement units or other instruments related to the system being simulated, other simulations, user interface events, or events driven automatically based on the state of the simulation. The simulation timestep may fixed or variable, and may be negotiated automatically among the HHC, systems of HHCs, external simulators and input/output mechanisms such as external instrumentation systems, sensors or user interfaces (see, e.g., U.S. patent application Ser. No. 13/347,880, titled "Co-Simulation with Peer Negotiated Time Steps", which was incorporated by reference above). Internal or external information may also be used to inform or transform the state of the simulation. The HHC based simulator may have the ability to automatically switch in a "bumpless" manner between various model representations and look-up-table datasets, which may represent the system in different configurations or may represent the system with different levels of fidelity.

In this way, embodiments of the present techniques may enable automated hardware acceleration of simulations and other computationally intensive tasks using a (possibly graphical) programming environment and floating point math on HHCs.

Global Optimization of a Program Targeted to Heterogeneous Programmable Hardware The techniques disclosed herein may also be applied to global optimization of complex programs. The following describes optimization of a program, e.g., a graphical program, or a textual program, with floating point math functionality, and targeted for deployment to a system with heterogeneous hardware components, according to some exemplary embodiments.

For example, in some embodiments, mathematical optimization techniques and algorithms, including global optimization techniques, may be used in combination with floating point math for computing the value of a function or simulation by execution of the floating point math on HHCs. Thereby, given user defined goals and constraints, a design space represented using graphical floating point math may be automatically explored for the purpose selecting or synthesizing one or more of: an optimal set of parameters, component values, software tuning parameters, alternative system designs and circuit topologies, alternative models or model representations, combinations, curve fitting coefficients, calibration parameters, component lifetime, system reliability, margin of safety, cost, time, path length, resources, circuit design, design synthesis, planning, logistics, and/or manufacturing options, among others. Such exploration of the design space may provide means to evaluate a plurality of non-linear design tradeoffs from a set of simulated or mathematically modeled alternatives using measurements from a simulated or physical system that is parameterized, modeled, or otherwise configured using (possibly graphical) floating point math executing in programmable hardware elements.

Moreover, in some embodiments, optimization, search, decision, and Bayesian probabilistic techniques, implemented using textual, graphical programming, or other methods, may be integrated with the high speed, parallel execution of floating-point data flow math on reconfigurable hardware targets, which is needed to grapple with complex non-linear, multi-domain design tradeoffs including non-deterministic polynomial-time hard (NP-hard) problems and computationally irreducible problems. For example, as applied to the design of power converters for renewable energy, electric vehicle and smart grid applications, these techniques may enable the designers of these complex, multi-physics, networked systems to optimize for multiple design goals simultaneously, including, for example, one or more of: energy efficiency, cost, component lifetime, systematic reliability, regulatory compliance, interoperability and compatibility, and other differentiating product features as necessary to increase the performance-per-dollar and other positive attributes of next generation renewable energy systems.

In various embodiments, the optimization techniques may include evolutionary algorithms, neural or fuzzy algorithms capable of searching complex non-linear systems containing multiple variables, complex mathematics, or multiple design constraints, among others. Multiple parallel floating-point simulations of the system may be executed on the HHCs which may be fed populations of identical or varying configuration parameters, states, or simulation mathematics by the global optimization routine.

In this way, high order, non-linear design spaces may be explored using hardware acceleration to identify "global optimal" choices of topologies, component choices, control software tuning gains, and so forth.

Globally Optimal Inverter Designs

The global optimization of power inverter and control software designs involving multiple variables with non-linear tradeoffs is extremely computationally intensive, and so the technology has previously been limited to relatively simple systems. However, real-time and faster-than-real-time power electronics and grid simulation technologies made possible by the present techniques, e.g., using newly introduced floating point math capabilities and heterogeneous SOCs containing a mix of DSP cores, FPGA fabric and microprocessors, facilitates global optimization of more complex system optimization. One particular approach utilizes new global optimization algorithms based on a technique called "differential evolution" that is capable of dealing with complex non-linear systems containing multiple "false positive" solutions and multiple design constraints.

Figure 26:
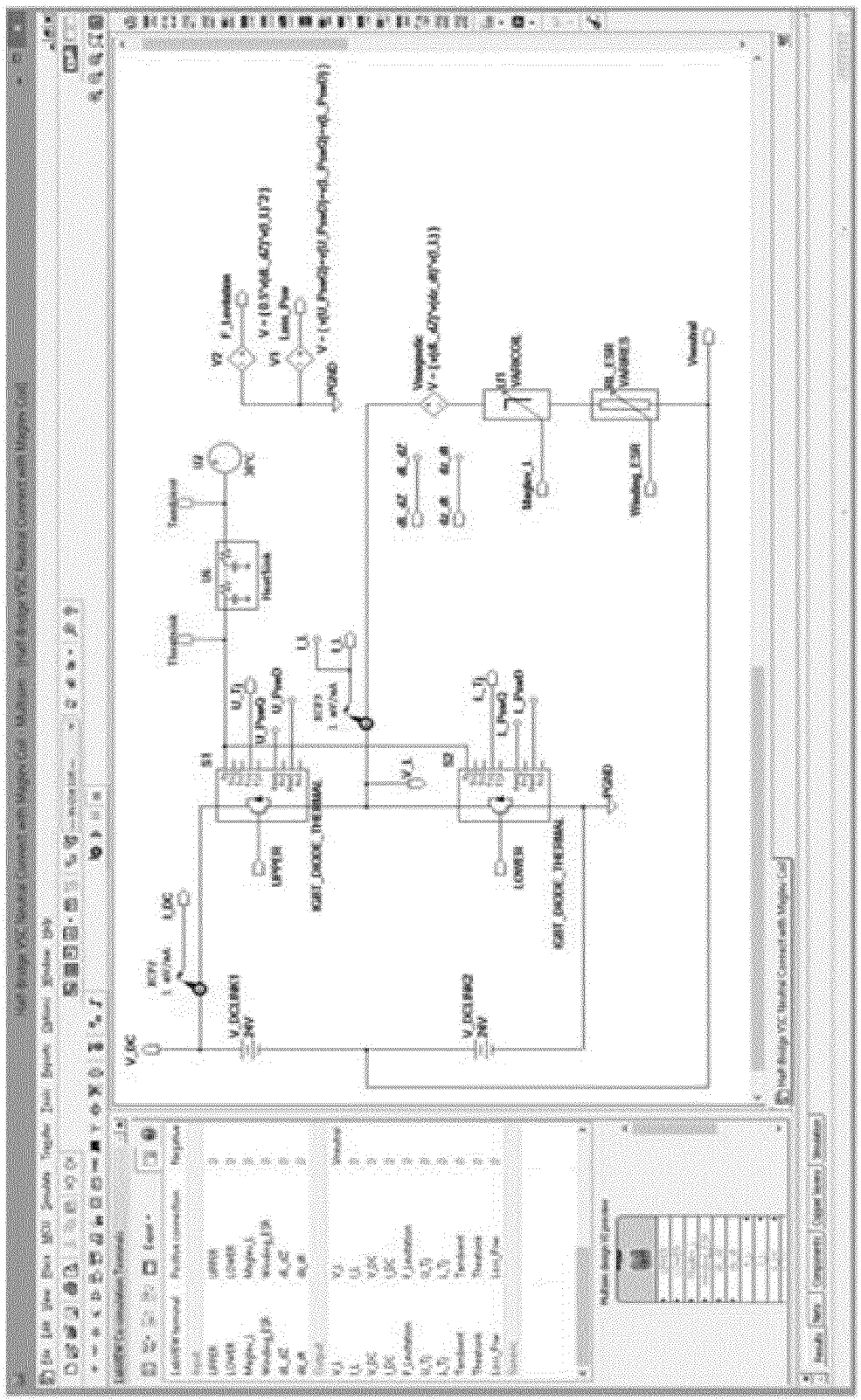
FIG. 26 illustrates an exemplary circuit design suitable for global optimization via embodiments of the techniques disclosed.

For example, consider the problem of finding a globally optimal design for an electric motor or magnetic levitation half-bridge IGBT inverter control system, such as that shown in FIG. 26. The goal may be to design an inverter with the best performance, highest energy efficiency, longest component lifetime and minimum cost. There are constraints based on the temperature, voltage and current limitations of the IGBTs. The first goal may be to optimize the power electronics circuit design and then the control software tuning to achieve a globally optimal result that spans the boundary between the multi-physics (electro-thermal) circuit design and the embedded software design. To do this, the circuit design may be exported to a development environment, e.g., LabVIEW FPGA™, to create multiple parallel floating-point simulations of the system, and the global optimization routine may execute the simulations in parallel until the design space has been fully or at least adequately explored, where the various parameters defining the design space may be varied over the different simulations, and the corresponding performance, energy efficiency, component lifetime, and cost for each simulated system compared to determine the optimum solution.

Of course, these techniques may be applied to any type of system simulation as desired.

Although the embodiments above have been described in considerable detail, numerous variations and modifications will become apparent to those skilled in the art once the above disclosure is fully appreciated. More specifically, it should be noted that any combinations of the above techniques and elements may be used as desired. It is intended that the following claims be interpreted to embrace all such variations and modifications.

We claim:

1. A non-transitory computer accessible memory medium that stores program instructions for configuring a system of heterogeneous hardware components, wherein the program instructions are executable by a processor to:

create a graphical program that includes floating point math functionality, wherein the graphical program comprises a plurality of interconnected nodes that visually indicate functionality of the graphical program, wherein the graphical program is targeted for distributed deployment on a system comprising heterogeneous hardware components, including at least one programmable hardware element, at least one digital signal processor (DSP) core, and at least one programmable communication element (PCE);

automatically determine respective portions of the graphical program for deployment to respective ones of the heterogeneous hardware components, including automatically determining respective execution timing for the respective portions;

automatically generate first program code implementing communication functionality between the at least one programmable hardware element and the at least one DSP core, wherein the first program code is targeted for deployment to the at least one programmable communication element; and automatically generate at least one hardware configuration program from the graphical program and the first program code, wherein said automatically generating comprises compiling the respective portions of the graphical program and the first program code for deployment to respective ones of the heterogeneous hardware components;

wherein the hardware configuration program is deployable to the system, wherein after deployment, the system is configured to execute the graphical program concurrently, including the floating point math functionality.

2. The non-transitory computer accessible memory medium of claim 1, wherein the system comprises a heterogeneous system on a chip.

3. The non-transitory computer accessible memory medium of claim 1, wherein the system comprises a heterogeneous system implemented on multiple chips.

4. The non-transitory computer accessible memory medium of claim 1, wherein the program instructions are further executable to:

automatically deploy the hardware configuration program to the system.

5. The non-transitory computer accessible memory medium of claim 1, wherein the heterogeneous hardware components further include at least one microprocessor.

6. The non-transitory computer accessible memory medium of claim 1, wherein the heterogeneous hardware components further include at least one at least one graphics processing unit (GPU).

7. The non-transitory computer accessible memory medium of claim 1, wherein the at least one PCE comprises one or more PCEs for internal communications between the at least one programmable hardware element and the at least one DSP core.

8. The non-transitory computer accessible memory medium of claim 1, wherein the at least one PCE comprises at least one I/O block for communications between the at least one programmable hardware element or the at least one DSP core and external components or systems.

9. The non-transitory computer accessible memory medium of claim 1, wherein the system comprises one or more chips, and wherein the at least one PCE is configurable for intra-chip communications or inter-chip communications.

10. The non-transitory computer accessible memory medium of claim 1, wherein to create the graphical program, the program instructions are executable to:

generate the graphical program based on one or more of:
at least one text-based program;
at least one simulation or model;
at least one circuit diagram;
at last one network diagram; or
at least one statechart.

11. The non-transitory computer accessible memory medium of claim 1, wherein the graphical program comprises a graphical data flow program.

12. The non-transitory computer accessible memory medium of claim 1, wherein the graphical program comprises a plurality of graphical data transfer and synchronization mechanisms represented by graphical floating-point programming nodes, functions, and wires, wherein the graphical data transfer and synchronization mechanisms are deployable to the heterogeneous hardware components, thereby enabling the heterogeneous hardware components implementing the floating-point math functionality to simulate physical systems in which measurements, state-values, inputs, outputs and parameters are shared between the heterogeneous hardware components.

13. The non-transitory computer accessible memory medium of claim 1, wherein the graphical program comprises multiple models of computation.

14. A method for configuring a system of heterogeneous hardware components, the method comprising:

creating a graphical program that includes floating point math functionality, wherein the graphical program comprises a plurality of interconnected nodes that visually indicate functionality of the graphical program, wherein the graphical program is targeted for distributed deployment on a system comprising heterogeneous hardware components, including at least one programmable hardware element, at least one digital signal processor (DSP) core, and at least one programmable communication element (PCE);

automatically determining respective portions of the graphical program for deployment to respective ones of the heterogeneous hardware components, including automatically determining respective execution timing for the respective portions;

automatically generating first program code implementing communication functionality between the at least one programmable hardware element and the at least one DSP core, wherein the first program code is targeted for deployment to the at least one programmable communication element; and automatically generating at least one hardware configuration program from the graphical program and the first program code, wherein said automatically generating comprises compiling the respective portions of the graphical program and the first program code for deployment to respective ones of the heterogeneous hardware components;

wherein the hardware configuration program is deployable to the system, wherein after deployment, the system is configured to execute the graphical program concurrently, including the floating point math functionality.

15. The method of claim 14, wherein the system comprises a heterogeneous system on a chip.

16. The method of claim 14, wherein the system comprises a heterogeneous system implemented on multiple chips.

17. A non-transitory computer accessible memory medium that stores program instructions for configuring a system of heterogeneous hardware components, wherein the program instructions are executable by a processor to:

create a graphical program that includes floating point functionality, wherein the graphical program is targeted for distributed deployment on a system comprising heterogeneous hardware components, including:
at least one programmable hardware element;
at least one digital signal processor (DSP) core;
at least one programmable communication element (PCE);

automatically determining respective portions of the graphical program for respective deployment to the heterogeneous hardware components, including automatically determining respective execution timing for the respective portions, wherein the respective portions comprise:
a first portion targeted for deployment to the at least one programmable hardware element; and
a second portion targeted for deployment to the at least one DSP core;

automatically generating program code implementing communication functionality between the at least one programmable hardware element and the at least one DSP core, using the at least one communication element;

automatically generating at least one hardware configuration program from the graphical program, including:
  compiling the first portion of the graphical program for deployment to the at least one programmable hardware element, thereby generating a first portion of the at least one hardware configuration program;
  compiling the second portion of the graphical program for deployment to the at least one DSP core, thereby generating a second portion of the at least one hardware configuration program;
  compiling the automatically generated program code implementing communication functionality for deployment to the at least one communication element, thereby generating a third portion of the at least one hardware configuration program;
wherein the hardware configuration program is deployable to the system, including:
  configuring the at least one programmable hardware element with the first portion of the at least one hardware configuration program;
  configuring the at least one DSP core with the second portion of the at least one hardware configuration program; and
  configuring the at least one communication element with the third portion of the at least one hardware configuration program;
wherein after deployment, the system is configured to execute the graphical program concurrently, including the floating point functionality, wherein during execution:
  the at least one programmable hardware element performs the functionality of the first portion of the graphical program;
  the at least one DSP core performs the functionality of the second portion of the graphical program; and
  the at least one communication element implements communication between the at least one programmable hardware element and the at least one DSP core.

18. The non-transitory computer accessible memory medium of claim 17, wherein the system comprises a heterogeneous system on a chip.

19. The non-transitory computer accessible memory medium of claim 17, wherein the system comprises a heterogeneous system implemented on multiple chips.

20. The non-transitory computer accessible memory medium of claim 17, wherein the graphical program comprises a graphical data flow program.

* * * * *